US009450312B2

(12) United States Patent
Takahashi et al.

(10) Patent No.: US 9,450,312 B2
(45) Date of Patent: Sep. 20, 2016

(54) MAGNETIC METAL PARTICLE AGGREGATE AND RADIO WAVE ABSORBER

(71) Applicant: Kabushiki Kaisha Toshiba, Minato-ku (JP)

(72) Inventors: Toshihide Takahashi, Yokohama (JP); Tomohiro Suetsuna, Kawasaki (JP); Koichi Harada, Bunkyo (JP); Seiichi Suenaga, Yokohama (JP); Tomoko Eguchi, Chuo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 58 days.

(21) Appl. No.: 14/480,773

(22) Filed: Sep. 9, 2014

(65) Prior Publication Data

US 2015/0084804 A1 Mar. 26, 2015

(30) Foreign Application Priority Data

Sep. 20, 2013 (JP) ................................ 2013-194770
Aug. 28, 2014 (JP) ................................ 2014-173515

(51) Int. Cl.
*H01Q 17/00* (2006.01)
*G01S 13/00* (2006.01)

(52) U.S. Cl.
CPC ..... *H01Q 17/004* (2013.01); *Y10T 428/12014* (2015.01)

(58) Field of Classification Search
CPC .. H01Q 17/00; H01Q 17/004; H01Q 17/005; Y10T 428/12; Y10T 428/12014; Y10T 428/12181; B82Y 25/00; B82Y 30/00; B32B 5/16; B32B 21/02; H01F 1/01; H01F 1/03; H01F 1/12; H01F 1/33; A61K 9/48; A61K 9/50; A61K 9/5094
USPC .......... 342/1-4; 343/700 R, 787; 423/1, 579, 423/592.1, 632, 594.19; 424/400, 489; 427/127, 128, 132; 428/800, 826, 836, 428/836.1, 836.2, 544, 546
See application file for complete search history.

(56) References Cited

U.S. PATENT DOCUMENTS 7,238,331 B2 * 7/2007 Zhou ..................... B82Y 30/00 423/1
7,390,576 B2 * 6/2008 Sato ...................... B82Y 30/00 428/546

(Continued)

FOREIGN PATENT DOCUMENTS

CN 101178965 A 5/2008
CN 100411070 C 8/2008

(Continued)

OTHER PUBLICATIONS

Office Action issued in Chinese Patent Application No. 201410534515.X dated Jun. 30, 2016 with English Translation.

*Primary Examiner* — Bernarr Gregory
(74) *Attorney, Agent, or Firm* — Oblon, McClelland, Maier & Neustadt, L.L.P.

(57) ABSTRACT

A magnetic metal particle aggregate includes a plurality of magnetic metal particles including at least one magnetic metal selected from a first group consisting of Fe, Co, and Ni. The plurality of magnetic metal particles are partly bound with each other, and an average particle diameter of the plurality of magnetic metal particles is 10 nm or more and 50 nm or less. The magnetic metal particle aggregate has an average particle diameter of 15 nm or more and 200 nm or less.

16 Claims, 5 Drawing Sheets

(56) References Cited

U.S. PATENT DOCUMENTS

| | | | | | |
|---|---|---|---|---|---|
| 7,781,082 | B2 * | 8/2010 | Ohkoshi | B82Y 30/00 | 428/836.2 |
| 7,892,520 | B2 * | 2/2011 | Lu | B82Y 30/00 | 423/632 |
| 8,273,407 | B2 * | 9/2012 | Bergendahl | B82Y 25/00 | 427/127 |
| 8,305,281 | B2 * | 11/2012 | Suetsuna | H01F 1/33 | 343/787 |
| 8,475,922 | B2 * | 7/2013 | Suetsuna | B32B 5/16 | 343/787 |
| 8,945,628 | B2 * | 2/2015 | Weissleder | A61K 9/5094 | 424/489 |
| 2008/0181843 | A1 | 7/2008 | Lu et al. | | |
| 2008/0226899 | A1 | 9/2008 | Suetsuna et al. | | |
| 2010/0060539 | A1 | 3/2010 | Suetsuna et al. | | |
| 2011/0217543 | A1 | 9/2011 | Suetsuna et al. | | |

FOREIGN PATENT DOCUMENTS

| | | | |
|---|---|---|---|
| CN | 102385967 | A | 3/2012 |
| JP | 11-186781 | | 7/1999 |
| JP | 2001-358493 | | 12/2001 |
| JP | 2003-193103 | | 7/2003 |
| JP | 2003-324008 | | 11/2003 |
| JP | 2008-227067 | | 9/2008 |
| JP | 2010-87462 | | 4/2010 |
| JP | 2011-187568 | | 9/2011 |
| JP | 2011-207731 | | 10/2011 |

* cited by examiner

4/5

Before heat treatment

Less than 600°C
10
12
14
21
22
20

600°C or more
800°C or less
10
100
12
14
14
14

Temperature higher than 800°C

MAGNETIC METAL PARTICLE AGGREGATE AND RADIO WAVE ABSORBER

CROSS-REFERENCE TO RELATED APPLICATION

This application is based upon and claims the benefit of priority from Japanese Patent Applications No. 2013-194770, filed on Sep. 20, 2013; and No. 2014-173515, filed on Aug. 28, 2014, the entire contents of which are incorporated herein by reference.

FIELD

Embodiments described herein relate generally to a magnetic metal particle aggregate and a radio wave absorber.

BACKGROUND

A radio wave absorber of a magnetic loss type formed of a magnetic material generally has the absorbing characteristic of a wider frequency range than a radio wave absorber of a dielectric loss type or a conduction loss type. However, the radio wave absorber of the magnetic loss type with excellent characteristics in the range of 1 to 18 GHz has not been realized yet.

DETAILED DESCRIPTION

A magnetic metal particle aggregate according to an embodiment includes: a plurality of magnetic metal particles including at least one magnetic metal selected from a first group consisting of Fe, Co, and Ni, the plurality of magnetic metal particles being partly bound with each other, an average particle diameter of the plurality of magnetic metal particles being 10 nm or more and 50 nm or less, wherein the magnetic metal particle aggregate has an average particle diameter of 15 nm or more and 200 nm or less.

An embodiment of the present disclosure is hereinafter described with reference to the drawings.

A radio wave absorber of this embodiment includes a magnetic metal particle aggregate. The magnetic metal particle aggregate includes: a plurality of magnetic metal particles including at least one magnetic metal selected from a first group consisting of Fe, Co, and Ni, the plurality of magnetic metal particles being partly bound with each other, an average particle diameter of the plurality of magnetic metal particles being 10 nm or more and 50 nm or less, wherein the magnetic metal particle aggregate has an average particle diameter of 15 nm or more and 200 nm or less.

Figure 1:
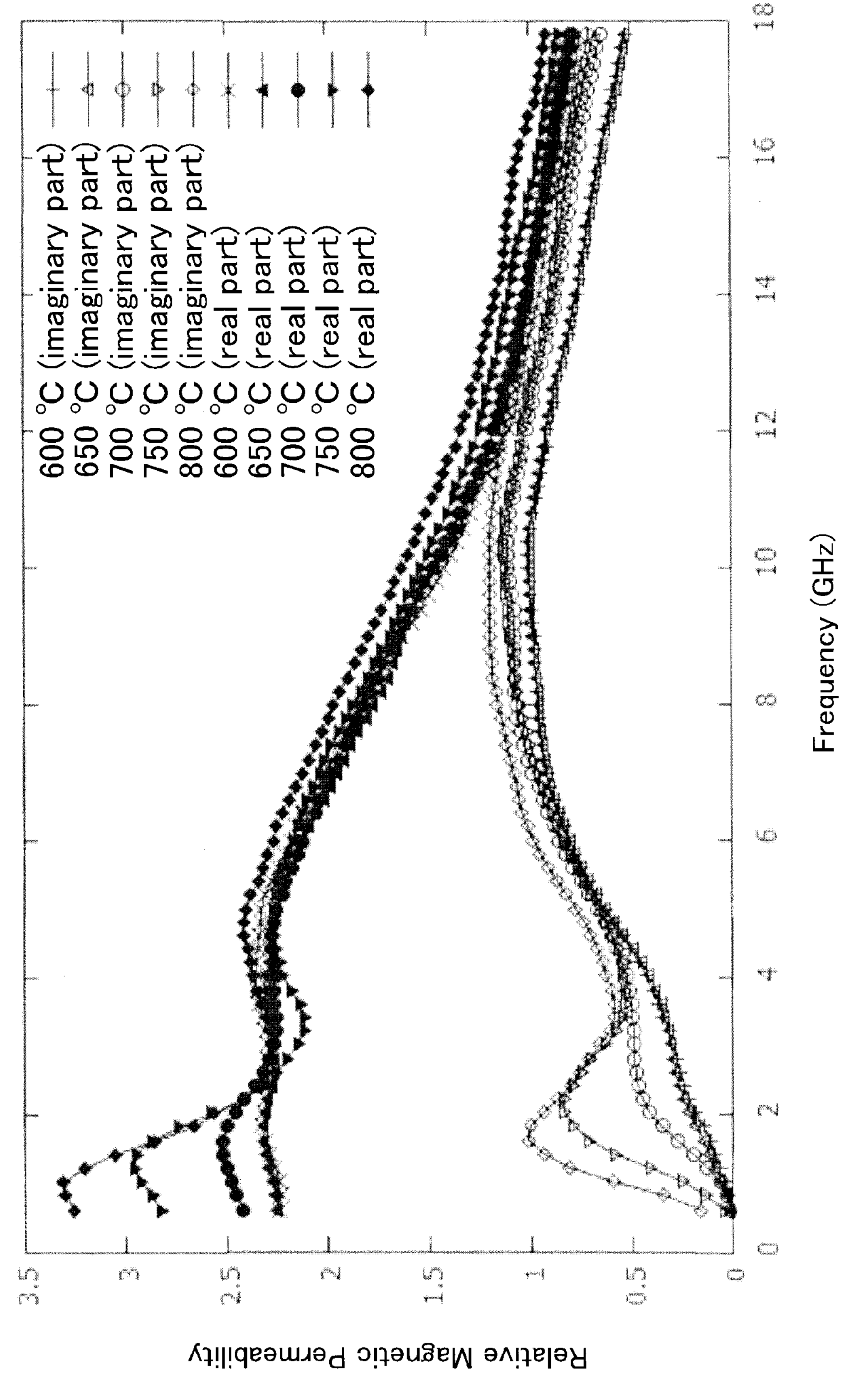
FIG. 1 is a diagram illustrating the frequency dependence of the relative magnetic permeability of a radio wave absorber according to an embodiment.

FIG. 1 is a diagram representing the frequency dependence of the relative magnetic permeability of the radio wave absorber according to this embodiment. The horizontal axis represents the frequency and the vertical axis represents the complex relative magnetic permeability (relative magnetic permeability real part, relative magnetic permeability imaginary part).

As depicted in FIG. 1, it is understood that the relative magnetic permeability imaginary part of a radio wave absorber 200 of this embodiment has the high loss and the high radio wave absorbing characteristic in the ultrawide band ranging from 1 to 18 GHz with a peak in 1 to 4 GHz in addition to the main peak observed in 4 to 18 GHz. It is noted that the dependency of the relative magnetic permeability on the composition of a magnetic metal particle aggregate 100 is within an extremely small range as compared to the dependence on the volume filling ratio.

It is noted that the volume filling ratio of the radio wave absorber 200 can be calculated through image processing of a photograph obtained by magnifying by 500000 times or 1000000 times depending on the particle diameter of the magnetic metal particle using a transmission electron microscope (TEM: Transmission Electron Microscopy), for example.

Figure 2:
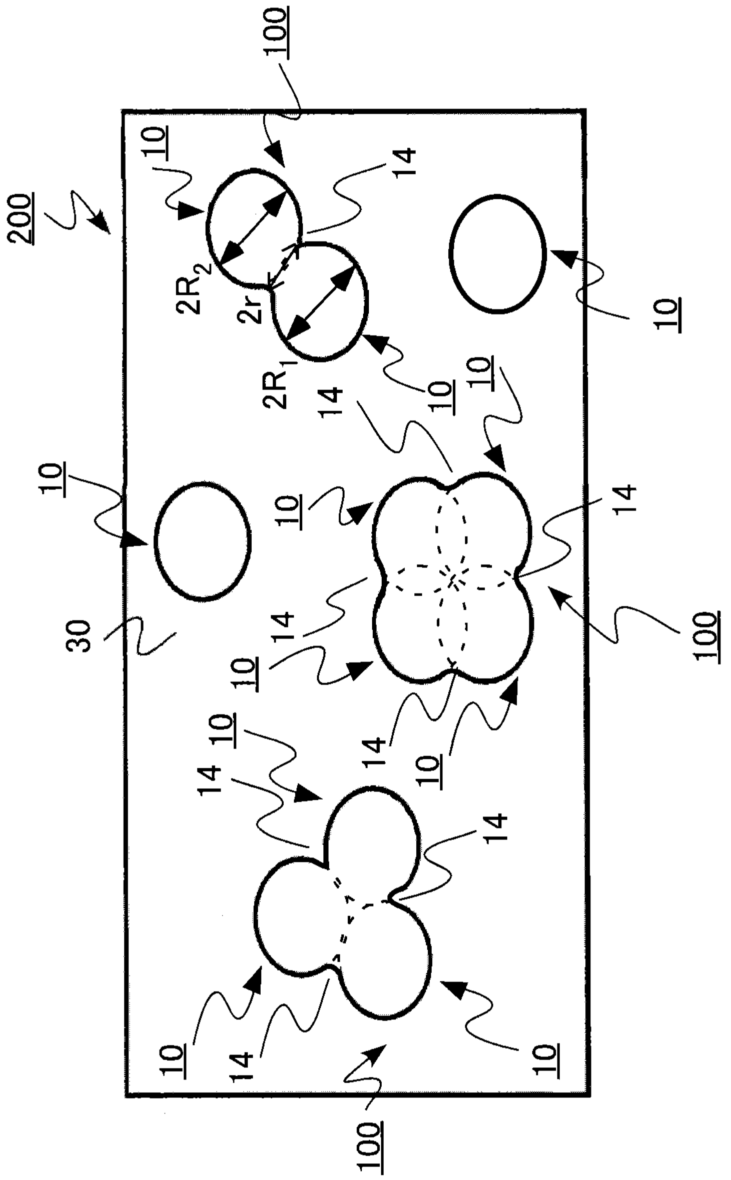
FIG. 2 is a schematic sectional view of the radio wave absorber according to the embodiment.

FIG. 2 is a schematic sectional view of the radio wave absorber 200 of this embodiment.

(Radio Wave Absorber)

The radio wave absorber 200 includes the magnetic metal particle aggregate 100 formed by binding parts of a plurality of magnetic metal particles 10, and a binding layer 30 that binds the magnetic metal particle aggregates 100.

The radio wave absorber 200 of this embodiment has the excellent radio wave absorbing characteristic in the high-frequency range such as the ultrawide range of 1 to 18 GHz by having the above structure.

(Magnetic Metal Particle Aggregate)

The magnetic metal particle aggregate 100 is a bound body with an average particle diameter of 15 nm or more and 200 nm or less. The magnetic metal particle aggregate 100 includes a plurality of magnetic metal particles which includes at least one kind of magnetic metal selected from the first group of Fe, Co, and Ni. The plurality of the magnetic metal particles are partly bound with each other. The plurality of the magnetic metal particles have an average particle diameter of 10 nm or more and 50 nm or less. The binding of the magnetic metal particles 10 occurs with the mutual diffusion of the elements included in the magnetic metal particles 10. FIG. 2 illustrates the case without the coating layer.

The magnetic metal particle aggregate 100 is formed by binding the plurality of magnetic metal particles 10. The binding occurs to such a degree that the size and shape of the original magnetic metal particles 10 can be estimated as illustrated in FIG. 2, for example. Thus, both the excellent radio wave absorbing characteristic in the high-frequency band ranging from about 4 GHz to 18 GHz due to the size and shape of the original magnetic metal particle 10 and the excellent radio wave absorbing characteristic in the low-frequency band ranging from about 1 GHz to 4 GHz due to the size and shape of the magnetic metal particle aggregate 100 formed by binding the magnetic metal particles 10 can be obtained at the same time. The portion formed by the binding as above is called necking 14. The diameter of the section of the necking 14 is shorter than the diameter of the entire magnetic metal particles 10 included in the necking 14. For example, in the magnetic metal particle aggregate 100 in the right part of the drawing, the diameter **2*r* of the section of the necking 14 is smaller than each of diameters 2R1 and 2R2 of the two magnetic metal particles 10 forming the necking 14**.

The average particle diameter of the magnetic metal particle aggregate 100 is 15 nm or more and 1000 nm or less, preferably 15 nm or more and 200 nm or less, and more preferably 15 nm or more and 90 nm or less. If the diameter is less than the above range, the superparamagnetism may occur in the magnetization of the magnetic metal particle aggregate 100 and the magnetic flux of the member to be obtained is deteriorated. On the other hand, if the diameter is greater than the above range, the eddy current loss is increased in the high-frequency region of the member to be obtained and the magnetic characteristic in the high-frequency region to be achieved by the present disclosure may be deteriorated.

The mode of the magnetic metal particle aggregate 100 is not limited thereto and various modes may be applicable. The degree of the binding of the magnetic metal particle 10 is not limited to that illustrated in FIG. 2. Inside the radio wave absorber 200, the unbound magnetic metal particle 10 may be present.

The average particle diameter of the magnetic metal particle aggregate 100 is obtained by, for example, drawing a circle circumscribing the magnetic metal particle aggregate 100 in the field of view (photograph) obtained by selecting 500000 times or 1000000 times depending on the diameter of the magnetic metal particle through the TEM and using the diameter of the circle as the particle diameter of the magnetic metal particle aggregate 100. In this case, since the field of view obtained by the TEM is rectangular, the diameters are obtained from the magnetic metal particle aggregate 100 on the diagonal line in the field of view and averaged, thereby providing the average particle diameter of the magnetic metal particle aggregate 100.

(Magnetic Metal Particle)

The magnetic metal particle 10 is a particle with an average particle diameter of 10 nm or more and 50 nm or less and includes one or two or more magnetic metal elements selected from the first group of Fe, Co, and Ni.

The magnetic metal of the magnetic metal particle 10 that is selected from the first group may be a single element of Fe, Co, or Ni or may be the alloy containing any of these. In particular, the Fe-based alloy, the Co-based alloy, and the FeCo-based alloy are preferable because the high saturation magnetization can be achieved. The Fe-based alloy may contain Ni, Mn, Cu, or the like as a second composition. For example, the FeNi-based alloy, the FeMn-based alloy, and the FeCu-based alloy are given. The Co-based alloy may contain Ni, Mn, Cu, or the like as a second composition. For example, the CoNi-based alloy, the CoMn-based alloy, and the CoCu-based alloy are given. As an example of the FeCo-based alloy, the alloy containing Ni, Mn, Cu, or the like as the second composition is given. For example, the FeCoNi-based alloy, the FeCoMn-based alloy, and the FeCoCu-based alloy are given. The second composition given above is effective for improving the high-frequency magnetic characteristic by decreasing the magnetic loss in the composite member including the magnetic metal particle 10.

The magnetic metal particle 10 may include the solid solution of a carbon atom or a nitrogen atom.

The composition of the elements of the first group and a second group included in the magnetic metal particle 10 can be analyzed by a method below. For example, the analysis of the non-magnetic metal such as Al may employ the inductively coupled plasma (ICP) emission spectroscopy or the like. According to the ICP emission spectroscopy, the composition of the core portion can be clarified by comparing the analysis results of the magnetic metal particle 10 portion dissolved by weak acid, the residue left after a coating layer 20 is dissolved by alkaline, strong acid, or the like; namely, the amount of the non-magnetic metal in the magnetic metal particle 10 can be separately measured.

The solid solution state of the composition belonging to the second group relative to the composition belonging to the first group included in the magnetic metal particle 10 can be determined based on the lattice constant measured by the X-ray diffraction (XRD). For example, when Fe includes the solid solution of Al or carbon, the lattice constant of Fe is changed according to the amount of the solid solution. In the case of bcc-Fe which does not contain the solid solution, the lattice constant is ideally approximately 2.86; when the solid solution of Al is included, the lattice constant is increased and the inclusion of the solid solution of approximately 5 at % of Al increases the lattice constant by approximately 0.005 to 0.01. In the case of the inclusion of the solid solution of approximately 10 at % of Al, the lattice constant is increased by approximately 0.01 to 0.02. The lattice constant is increased also when the bcc-Fe includes the solid solution of carbon, and the lattice constant is increased by approximately 0.001 when the solid solution of approximately 0.02 mass % of carbon is included. In this manner, the lattice constant of the magnetic metal particle can be obtained through the XRD measurement of the magnetic metal particle 10 and from the lattice constant, whether the solid solution is included or not, or how much the solid solution is included, can be easily determined. Further, whether the solid solution is included or not can be checked by the electron beam diffraction pattern of the particle by the TEM.

The magnetic metal particle 10 may be in either the polycrystalline state or the single-crystal state, but is preferably in the single-crystal state. When the composite member including the particle of the single crystal is used in the high-frequency device, it becomes possible to align the easy axis of magnetization becomes and thus the magnetic anisotropy can be controlled. Therefore, it is possible to improve the high-frequency characteristic as compared to the high-frequency magnetic material containing the polycrystalline magnetic metal particle 10.

The magnetic metal particle 10 has an average particle diameter of 1 nm or more and 1000 nm or less in the particle size distribution, preferably 1 nm or more and 100 nm or less, and more preferably 10 nm or more and 50 nm or less. When the average particle diameter is less than 10 nm, the superparamagnetism may occur and the magnetic flux of the composite member to be obtained may deteriorate. On the other hand, when the average particle diameter is greater than 1000 nm, the eddy current loss is increased in the high-frequency region of the member to be obtained and the magnetic characteristic in the high-frequency region to be achieved by the present disclosure may be deteriorated. When the particle diameter of the magnetic metal particle 10 is increased, the multi-magnetic-domain structure is more stable in terms of energy than the single-magnetic-domain structure. On this occasion, the high-frequency characteristic of the magnetic permeability of the composite member obtained by the magnetic metal particle 10 with the multi-magnetic-domain structure is lower than that with the single-magnetic-domain structure.

In view of the above, in the case of using the magnetic metal particle 10 as the high-frequency magnetic member, the magnetic metal particle 10 is preferably present as the particle with the single-magnetic-domain structure. The critical particle diameter of the magnetic metal particle 10 maintaining the single-magnetic-domain structure is approximately 50 nm or less; therefore, the average particle diameter of the magnetic metal particle 10 is preferably 50 nm or less. In view of the above, the average particle diameter of the magnetic metal particle 10 is 1 nm or more and 1000 nm or less, preferably 1 nm or more and 100 nm or less, and more preferably 10 nm or more and 50 nm or less.

The average particle diameter of the magnetic metal particle 10 is obtained by, for example, calculating the particle diameters of the magnetic metal particles 10 on a diagonal line in the field of view (photograph) obtained by selecting 500000 times or 1000000 times depending on the diameter of the magnetic metal particle through the TEM and averaging the diameters of the magnetic metal particles. As for the magnetic metal particles 10 which are partly bound with each other, an outer shape of the unbound magnetic metal particle 10 is inserted into the bound portion (necking) and the particle diameter is obtained as illustrated by the dotted lines in FIG. 2. By averaging the diameters obtained thereby, the average particle diameter is obtained.

The magnetic metal particle 10 may be spherical, and may alternatively be a flat shape or a bar-like shape with a large aspect ratio (e.g., 10 or more). The bar-like shape includes a spheroid. Here, "aspect ratio" refers to the ratio of the height to the diameter (height/diameter). In the case of the spherical shape, the height and the diameter are equal; therefore, the aspect ratio is 1. The aspect ratio of the flat particle is (diameter/height). The aspect ratio of the bar-like shape is (bar length/diameter of bar bottom). The aspect ratio of the spheroid is (major axis/minor axis). As for the particle diameter of the magnetic metal particle 10 with an aspect ratio of 1 or more, the average of the height and diameter of the magnetic metal particles 10, the average of the bar length and the diameter of bar bottom, or the average of the major axis and the minor axis, which is obtained by TEM or SEM observation, is given.

When the aspect ratio is increased, the magnetic anisotropy depending on the shape can be applied and the high-frequency characteristic of the magnetic permeability can be improved. Moreover, when the magnetic metal particles 10 are unified to fabricate a desired member, the particles can be easily oriented by the magnetic field; therefore, the high-frequency characteristic of the magnetic permeability can be further improved. Moreover, by increasing the aspect ratio, the critical particle diameter of the core portion to be the single-magnetic-domain structure can be increased to, for example, more than 90 nm. In the case of the spherical magnetic metal particle 10, the critical particle diameter to be the single-magnetic-domain structure is approximately 90 nm.

In the flat magnetic metal particle 10 with a large aspect ratio, the critical particle diameter can be increased and the high-frequency characteristic of the magnetic permeability does not deteriorate. Since the synthesis is generally easier when the particle diameter is larger, the aspect ratio is preferably larger from the viewpoint of fabrication. In addition, by increasing the aspect ratio, the filling ratio can be increased when the desired member is fabricated; thus, the saturation magnetization per unit volume and mass of the member can be increased. As a result, the magnetic permeability can be increased.

The magnetic metal particle aggregate 100 according to this embodiment is the magnetic metal particle aggregate 100 in which the frequency dependence of the imaginary part of the relative magnetic permeability of the magnetic metal particle aggregate 100 has peaks at two frequencies. Thus, the high absorption characteristic can be exhibited in the ultrawide band from, for example, 1 GHz to 18 GHz. It is noted that the frequency range is not limited thereto. The peaks may appear at three or more frequencies depending on the size or state of the magnetic metal particle aggregate 100.

The magnetic metal particle aggregate 100 according to this embodiment is the magnetic metal particle aggregate 100 in which the frequency dependence of the real part of the relative magnetic permeability of the magnetic metal particle aggregate 100 has peaks at two frequencies. Thus, the high absorption characteristic can be exhibited in the ultrawide band from, for example, 1 GHz to 18 GHz. It is noted that the frequency range is not limited thereto. The peaks may appear at three or more frequencies depending on the size or state of the magnetic metal particle aggregate 100.

Figures 3A, 3B, 3C, 3D:
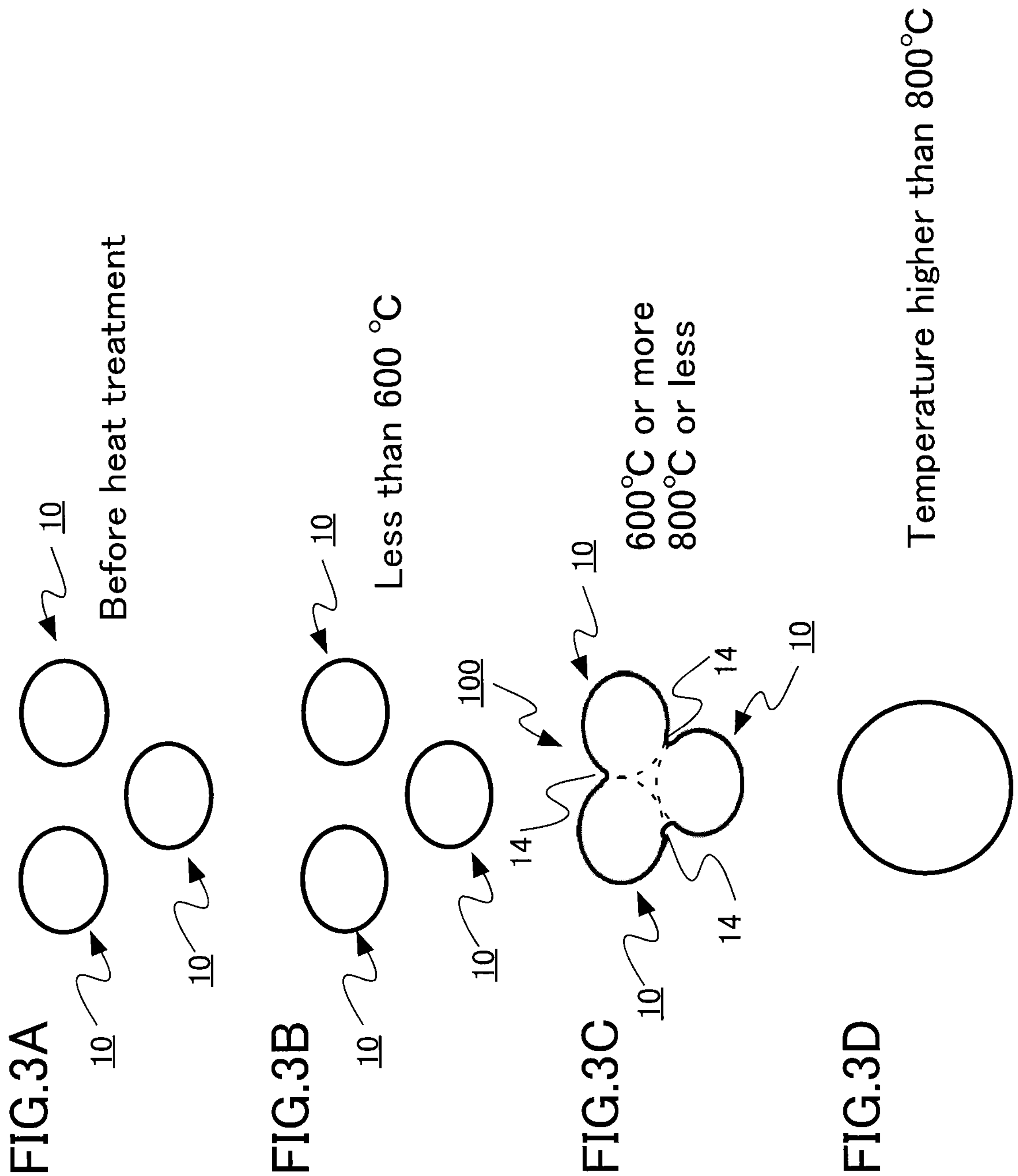
FIGS. 3A to 3D are diagrams illustrating the state in which the magnetic metal particles according to the embodiment are bound with each other.

FIGS. 3A to 3D illustrate the plurality of magnetic metal particles 10 before and after the heat treatment. The heating temperature when the magnetic metal particle aggregate is fabricated by binding the plurality of magnetic metal particles in this embodiment is desirably 600° C. or more and 800° C. or less. FIG. 3A illustrates the plurality of magnetic metal particles 10 before the heat treatment. FIG. 3B illustrates the plurality of magnetic metal particles 10 after the heat treatment in which the heating temperature is less than 600° C. In this case, since the heating temperature is not sufficiently high, the mutual diffusion of atoms in each magnetic metal particle 10 does not occur. Therefore, the mode of the plurality of magnetic metal particles 10 is the same as that before the heat treatment illustrated in FIG. 3A.

The relative magnetic permeability of the magnetic metal particle 10 illustrated in FIG. 3B has a peak between, for example, 4 and 18 GHz that is due to the original mode of the magnetic metal particle 10.

FIG. 3C illustrates the plurality of magnetic metal particles 10 after the heat treatment in the case where the heating temperature is 600° C. or and 800° C. or less. In this case, the mutual diffusion of the atoms within each magnetic metal particle 10 and between the magnetic metal particles 10 occurs to such a degree that the magnetic metal particles 10 are partly bound with each other while the original mode of the magnetic metal particle 10 is maintained to some extent. Therefore, in the fabricated magnetic metal particle aggregate 100, the plurality of magnetic metal particles 10 is bound with each other and the properties of the original magnetic metal particle 10 such as the diameter thereof are identified to some extent.

The relative magnetic permeability of the magnetic metal particle aggregate 100 illustrated in FIG. 3C has a peak in, for example, 4 to 18 GHz that is due to the properties of the original magnetic metal particle 10. Moreover, the peak appears in 1 to 4 GHz that is due to the mode of the metal particle aggregate formed by the binding of the plurality of magnetic metal particles 10. As a result, the magnetic metal particle aggregate 100 illustrated in FIG. 3C exhibits the high radio wave absorption in the wide frequency band.

FIG. 3D illustrates the plurality of magnetic metal particles 10 after the heat treatment in the case where the heating temperature is higher than 800° C. In this case, the mutual diffusion of the atoms between the magnetic metal particles 10 occurs extremely intensively. Therefore, the mode of the manufactured magnetic metal particle aggregate

100 is one sphere in which the characteristic of the original mode of the original magnetic metal particle 10 cannot be identified.

The relative magnetic permeability of the magnetic metal particle aggregate 100 illustrated in FIG. 3D has a peak in 1 to 4 GHz due to the mode of the magnetic metal particle aggregate 100 with a shape of a sphere.

In this manner, the heating temperature when the magnetic metal particle aggregate is manufactured by binding the plurality of magnetic metal particles is desirably 600° C. or more and 850° C. or less. The more preferable heating temperature is 650° C. or more and 800° C. or less, and much more preferably 650° C. or more and 750° C. or less where the way of binding the magnetic metal particles 10 through the mutual diffusion and the way of maintaining the mode are balanced.

The volume filling ratio of the magnetic metal particle aggregate 100 in the radio wave absorber 200 is preferably 10% or more and 60% or less, and more preferably 15% or more and 50% or less. When the ratio is greater than the above range, the properties of the metal are exhibited, and thus the reflectance is increased and the radio wave absorbing characteristic is deteriorated. On the other hand, when the ratio is less than the above range, the saturation magnetization may deteriorate and the radio wave absorbing characteristic due to the magnetic characteristic may deteriorate accordingly. In addition, the thickness necessary for achieving the practical radio wave absorbing characteristic may become too large.

The volume filling ratio of the radio wave absorber 200 can be calculated by, for example, performing an image process on a photograph obtained by selecting 500000 or 1000000 depending on the particle diameter of the magnetic metal particle using the TEM.

The electric resistance of the radio wave absorber 200 is 10 MΩ·cm or more, preferably 100 MΩ·cm or more, and more preferably 1000 MΩ·cm or more. Within this range, the reflection of the radio wave is suppressed and the high radio wave absorbing characteristic with high loss can be obtained. The electric resistivity is measured by providing an Au electrode with a diameter of 5 mm by a sputtering process on each of front and back surfaces of the radio wave absorber 200 with a disc-like shape having a diameter of 15 mm and a thickness of 1 mm and reading the current value when a voltage of 10 V is applied between the Au electrodes. Since the current value has the time dependence, the electric resistivity can be estimated from the value obtained after two minutes from when the voltage is applied.

(Magnetic Metal Particle Aggregate in which Plural Magnetic Metal Particles Having Coating Layer are Bound)

Figure 4A:
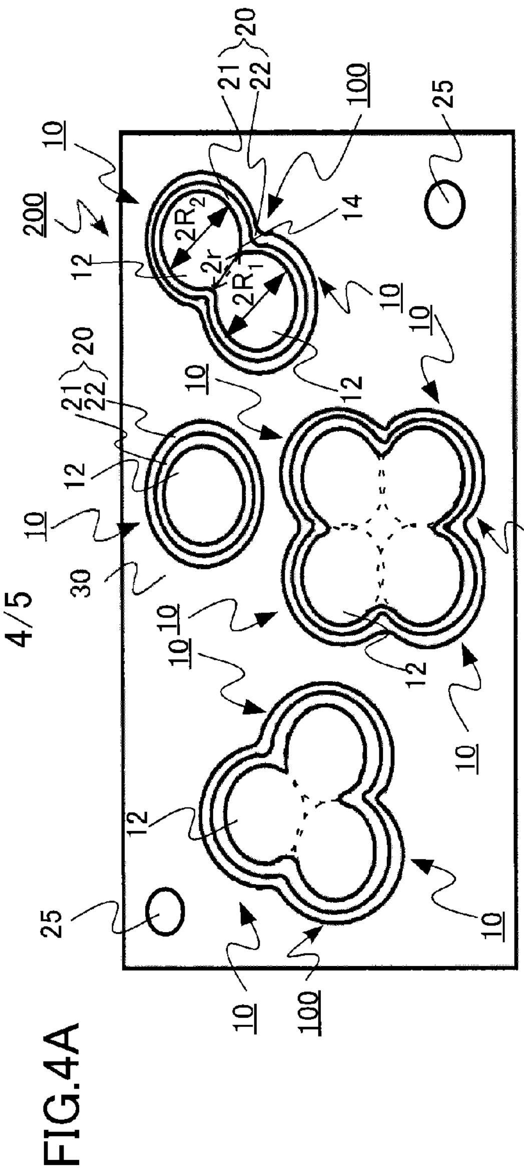
FIGS. 4A and 4B are schematic sectional views of the radio wave absorber according to the embodiment.
Figure 4B:
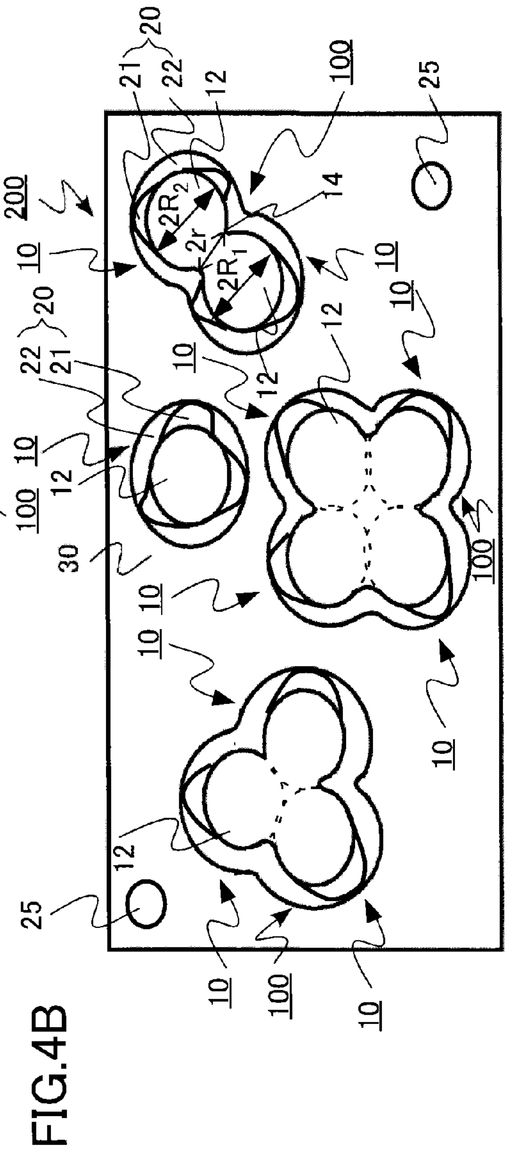

FIGS. 4A and 4B are diagrams of the radio wave absorber 200 manufactured from the magnetic metal particle aggregates 100 in which the plural magnetic metal particles 10 having the coating layer 20 are bound. This magnetic metal particle aggregate includes: a plurality of magnetic metal particles, each of the plurality of magnetic metal particles including a core portion including at least one magnetic metal selected from a first group consisting of Fe, Co, and Ni, and at least one metal selected from a second group consisting of Mg, Al, Si, Ca, Zr, Ti, Hf, Zn, Mn, a rare-earth metal element, Ba, and Sr, and a coating layer coating the core portion and including at least one metal selected from the second group, the metal being included in the core portion, wherein the magnetic metal particles are partly bound with each other and have an average particle diameter of 10 nm or more and 50 nm or less, and the magnetic metal particle aggregate has an average particle diameter of 15 nm or more and 200 nm or less. Here, the binding of the magnetic metal particles 10 occurs with the mutual diffusion of the elements of the magnetic metal particles 10. The illustration of FIGS. 4A and 4B and FIGS. 5A and 5D that overlaps with the illustration of FIG. 2 and FIGS. 3A to 3D are omitted. The mode of the magnetic metal particle aggregate 100 is not limited thereto and may be variously changed.

The magnetic permeability can be increased by forming the composite member with the use of the magnetic metal particle 10 including at least one kind of metal selected from the second group of Mg, Al, Si, Ca, Zr, Ti, Hf, Zn, Mn, a rare-earth metal element, Ba, and Sr. The oxide of the metal element of the second group has low standard generation Gibbs energy and is easily oxidized. Therefore, the element of the second group existing near the surface of the magnetic metal particle 10 easily forms an oxide layer 21. Moreover, the composite member is formed by having the element of the second group included in the oxide layer 21, whereby the electrical insulating property is stabilized.

The magnetic metal (metal element of the first group) included in the magnetic metal particle 10 may be either the single metal element or the alloy. In particular, the Fe-based alloy, the Co-based alloy, and the FeCo-based alloy are preferable because the high saturation magnetization can be achieved. The Fe-based alloy may be, for example, the FeNi alloy, the FeMn alloy, or the FeCu alloy containing Ni, Mn, Cu, or the like as the second composition. The Co-based alloy may be, for example, the CoNi alloy, the CoMn alloy, or the CoCu alloy containing Ni, Mn, Cu, or the like as the second composition. As an example of the FeCo-based alloy, the alloy containing Ni, Mn, Cu, or the like as the second composition is given. For example, the FeCoNi-based alloy, the FeCoMn-based alloy, and the FeCoCu-based alloy are given. The second compositions as above are effective in improving the high-frequency magnetic characteristic by decreasing the magnetic loss in the composite member including the magnetic metal particle 10.

Among the magnetic metal, the FeCo-based alloy is particularly preferable. The amount of Co in FeCo is preferably 10 atm % or more and 50 atm % or less from the viewpoint of satisfying the thermal stability, the oxidation resistance, and the saturation magnetization of 2 tesla or more. The amount of Co in FeCo is more preferably 20 atm % or more and 40 atm % or less from the viewpoint of increasing the saturation magnetization further.

Among the elements belonging to the second group, Al and Si particularly easily form the solid solution with Fe, Co, and Ni, which are the main components of the magnetic metal particle 10, and are therefore preferable for improving the thermal stability of the magnetic metal particle 10. In particular, the use of Al is preferable because the thermal stability and the oxidation resistance can be increased. The characteristics can be improved alternatively by adding another kind of element of the second group to the element of the second group. The element to be added is preferably the active metal element such as the rare-earth element because the characteristics such as the high-frequency magnetic permeability, the thermal stability, and the oxidation resistance of the composite member to be obtained can be further improved. For example, the rare-earth element such as Y is preferably added to the element including at least one of Al and Si. Alternatively, the similar effect can be expected by differentiating the valence of the other kind of element to be added belonging to the second group from the valence of the element belong to the second group. Further alternatively, the similar effect can be expected by increasing the radius of the atom of the other kind of element to be added belonging to the second group to be larger than the radius of the atom of the element belonging to the second group.

The amount of the element of the second group included in the magnetic metal particle 10 is preferably 0.001 mass % or more and 20 mass % or less relative to the amount of the element of the first group. When the content of the element of the second group is greater than 20 mass %, the saturation magnetization of the magnetic metal particle 10 may be deteriorated. From the viewpoints of the high saturation magnetization and solid solubility, the element is preferably mixed by 1 mass % or more and 10 mass % or less.

The magnetic metal particle 10 may include the solid solution of a carbon atom or a nitrogen atom.

The compositions of the elements of the first group and the second group included in the magnetic metal particle 10 can be analyzed by a method below, for example. The analysis of the non-magnetic metal such as Al can be conducted using ICP. According to the ICP emission spectroscopy, the composition of the magnetic metal particle 10 can be known by comparing the analysis results of the portion of the magnetic metal particle 10 dissolved by weak acid, the residue left after the coating layer 20 is dissolved by alkaline, strong acid, or the like, and the entire particle; in other words, the amount of the non-magnetic metal in the magnetic metal particle 10 can be separately measured.

The state of the solid solution of the composition belonging to the second group relative to the composition belonging to the first group included in the magnetic metal particle 10 can be determined based on the lattice constant measured by XRD. For example, when Fe includes the solid solution of Al or carbon, the lattice constant of Fe is changed depending on the amount of the solid solution. In the case of bcc-Fe which does not contain the solid solution, the lattice constant is ideally approximately 2.86; when the solid solution of Al is included, the lattice constant is increased and the inclusion of the solid solution of approximately 5 at of Al increases the lattice constant by approximately 0.005 to 0.01. In the case of the inclusion of the solid solution of approximately 10 at % of Al, the lattice constant is increased by approximately 0.01 to 0.02. The lattice constant is increased also when the bcc-Fe includes the solid solution of carbon, and the lattice constant is increased by approximately 0.001 when the solid solution of approximately 0.02 mass of carbon is included. In this manner, the lattice constant of the magnetic metal can be obtained through the XRD measurement of the magnetic metal particle 10 and from the lattice constant, whether the solid solution is included or not or how much the solid solution is included can be easily determined. Further, whether the solid solution is included or not can be checked by the electron beam diffraction pattern of the particle by the TEM.

The average particle diameter of the magnetic metal particle 10 is obtained by, for example, calculating the particle diameters of the magnetic metal particles 10 on a diagonal line in the field of view (photograph) obtained by selecting 500000 times or 1000000 times depending on the diameter of the magnetic metal particle through the TEM and averaging the diameters of the magnetic metal particles. As for the magnetic metal particles 10 which are partly bound with each other, an outer shape of the unbound magnetic metal particle 10 is inserted into the bound portion and the particle diameter is obtained as illustrated by a dotted line of FIGS. 4A to 4B. By averaging the diameters obtained thereby, the average particle diameter is obtained.

It is noted that the thickness of the coating layer 20 is not included in the particle diameter of the magnetic metal particle 10.

FIGS. 4A and 4B illustrate the radio wave absorbers 200 fabricated using the magnetic metal particle 10 in which the mode of the coating layer 20 is different. Specifically, the magnetic metal particle 10 used in FIG. 4A is the particle formed by the oxide layer 21 at the interface between the magnetic metal particle 10 and a carbon-contained material layer 22 in (3) an oxidation step of a manufacturing method for the magnetic metal particle aggregate 100 to be described later. Moreover, the magnetic metal particle 10 used in FIG. 4B is formed in a manner that the carbon-contained material layer 22 is partly oxidized and decomposed and the oxide layer 21 is formed in (3) the oxidation step of the manufacturing method for the magnetic metal particle aggregate 100 to be described later. It is noted that the carbon-contained material layer 22 may be removed in the case of, for example, performing (4) a deoxidation step that is employed as necessary in the manufacturing method for the magnetic metal particle aggregate 100 to be described later.

The coating layer 20 is to coat at least a part of a core portion 12 and includes at least the oxide layer 21 as aforementioned. The coating layer 20 may further include the carbon-contained material layer 22. The mode of the oxide layer 21 and the carbon-contained material layer 22 is not particularly limited but preferably has the structure in which the oxide layer 21 is in close contact with the core portion 12.

The radio wave absorber 200 may contain an oxide particle 25 in addition to the magnetic metal particle aggregate 100. The oxide particle 25 is formed by the separation of the oxide layer 21 from the magnetic metal particle 10. The oxide particle 25 includes the element belonging to the second group that is common to the magnetic metal particle 10 and the oxide layer 21. If the oxide layer 21 is not separated off from the magnetic metal particle 10, the oxide particle 25 may not be included in the radio wave absorber 200.

The magnetic metal particle aggregate 100 according to this embodiment is the magnetic metal particle aggregate 100 in which the frequency dependence of the imaginary part of the relative magnetic permeability of the magnetic metal particle aggregate 100 has peaks at two frequencies. Thus, the high absorption characteristic can be exhibited in the ultrawide band from, for example, 1 GHz to 18 GHz. It is noted that the frequency range is not limited thereto. The peaks may appear at three or more frequencies depending on the size or state of the magnetic metal particle aggregate 100.

The magnetic metal particle aggregate 100 according to this embodiment is the magnetic metal particle aggregate 100 in which the frequency dependence of the real part of the relative magnetic permeability of the magnetic metal particle aggregate 100 has peaks at two frequencies. Thus, the high absorption characteristic can be exhibited in the ultrawide band from, for example, 1 GHz to 18 GHz. It is noted that the frequency range is not limited thereto. The peaks may appear at three or more frequencies depending on the size or state of the magnetic metal particle aggregate 100.

Figures 5A, 5B, 5C, 5D:
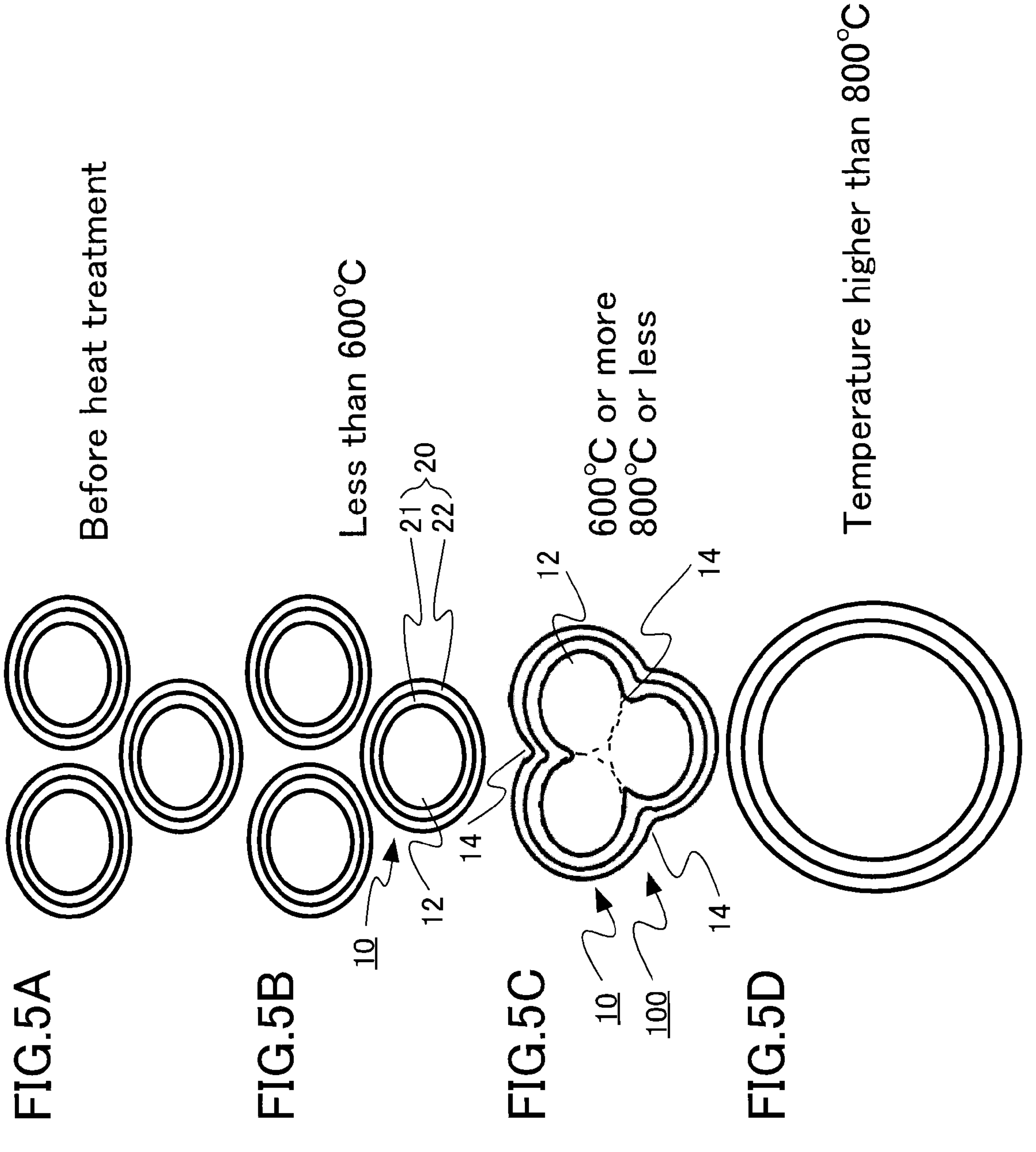
FIGS. 5A to 5D are diagrams illustrating the state in which the magnetic metal particles according to the embodiment are bound with each other.

FIGS. 5A to 5D illustrate the plurality of magnetic metal particles 10 before and after the heat treatment. It is noted that the carbon-contained material layer 22 may be removed in the case of, for example, performing (4) the deoxidation step that is employed as necessary in the manufacturing method for the magnetic metal particle aggregate 100 to be described below. The heating temperature when the magnetic metal particle aggregate is manufactured by binding the plurality of magnetic metal particles in this embodiment is desirably 600° C. or more and 850° C. or less. FIG. 5A illustrates the plurality of magnetic metal particles 10 before the heat treatment. FIG. 5B illustrates the plurality of magnetic metal particles 10 after the heat treatment in which the heating temperature is lower than 600° C. In this case, since the heating temperature is not sufficiently high, the mutual diffusion of atoms in each magnetic metal particle 10 does not occur. Therefore, the mode of the plurality of magnetic metal particles 10 is the same as that before the heat treatment illustrated in FIG. 5A.

The relative magnetic permeability of the magnetic metal particle 10 illustrated in FIG. 5B has a peak between 4 and 18 GHz that is due to the original mode of the magnetic metal particle 10.

FIG. 5C illustrates the plurality of magnetic metal particles 10 after the heat treatment in the case where the heating temperature is 600° C. or more and 800° C. or less. In this case, the mutual diffusion of the atoms within each magnetic metal particle 10 and between the magnetic metal particles 10 occurs appropriately to such a degree that the magnetic metal particles 10 are partly bound with each other while the mode of the original magnetic metal particle 10 is maintained to some extent. Therefore, in the manufactured magnetic metal particle aggregate 100, the plurality of magnetic metal particles 10 is bound with each other and the properties of the original magnetic metal particle 10 such as the diameter thereof are identified to some extent.

The relative magnetic permeability of the magnetic metal particle aggregate 100 illustrated in FIG. 5C has a peak in, for example, 4 to 18 GHz that is due to the characteristic of the original magnetic metal particle 10. Moreover, the peak appears in 1 to 4 GHz that is due to the mode of the metal particle aggregate formed by the binding of the plurality of magnetic metal particles 10. As a result, the magnetic metal particle aggregate 100 illustrated in FIG. 5C exhibits the high radio wave absorption in the wide frequency band.

FIG. 5D illustrates the plurality of magnetic metal particles 10 after the heat treatment in the case where the heating temperature is higher than 800° C. In this case, the mutual diffusion of the atoms between the magnetic metal particles 10 occurs extremely intensively. Therefore, the mode of the manufactured magnetic metal particle aggregate 100 is one sphere in which the characteristic of the original mode of the magnetic metal particle 10 cannot be identified.

The relative magnetic permeability of the magnetic metal particle aggregate 100 illustrated in FIG. 5D has a peak in 1 to 4 GHz due to the mode of the magnetic metal particle aggregate 100 with a shape of a sphere.

The heating temperature when the magnetic metal particle aggregate is manufactured by binding the plurality of magnetic metal particles in this embodiment is desirably 600° C. or more and 850° C. or less. The more preferable heating temperature is 650° C. or more and 800° C. or less, and much more preferably 650° C. or more and 750° C. or less where the way of binding the magnetic metal particles 10 through the mutual diffusion and the way of maintaining the mode are balanced. It is noted that the elements constituting the coating layer 20 may diffuse in the magnetic metal particle 10. The diffusion, however, does not cause any particular problem on the radio wave absorbing characteristic.

(Coating Layer/Oxide Layer)

The coating layer 20 is to coat at least a part of the core portion 12 and includes at least the oxide layer 21 as aforementioned. The coating layer 20 may further include the carbon-contained material layer 22. The mode of the oxide layer 21 and the carbon-contained material layer 22 is not particularly limited but preferably has the structure in which the oxide layer 21 is in close contact with the core portion 12. The proportion of the metal element of the second group relative to the magnetic metal of the first group is preferably higher in the oxide layer 21 than in the core portion 12. This is because the oxidation resistance of the particle is improved further.

The oxide layer 21 includes at least one kind of element of the second group, which is the composition of the core portion 12. In other words, the core portion 12 and the oxide layer 21 include the common element of the second group. In the oxide layer 21, the oxide is formed by the element common to the core portion 12. The oxide layer 21 is preferably the layer obtained by oxidizing the element of the second group of the core portion 12.

The thickness of the oxide layer 21 is preferably in the range of 0.01 to 5 nm. Over this range, the structure ratio of the magnetic metal may decrease so that the saturation magnetization of the particle may deteriorate. Below this range, on the other hand, the effect of stabilizing the oxidation resistance by the oxide layer 21 cannot be expected.

The amount of oxygen in the oxide layer 21 is not particularly limited; however, oxygen is preferably contained relative to the entire particle by 0.5 mass % or more and 10 mass % or less, more preferably 1 mass % or more and 10 mass % or less, and much more preferably 2 mass % or more and 7 mass % or less when the amount of oxygen is measured as the magnetic metal particle 10. Over this range, the structure ratio of the magnetic metal may decrease so that the saturation magnetization of the particle is deteriorated. Below this range, on the other hand, the effect of stabilizing the oxidation resistance by the oxide layer 21 cannot be expected.

In a method of determining the quantity of the oxygen, if the carbon-contained material layer 22 coats the surface of the magnetic metal, for example, 2 to 3 mg of a measurement sample in a carbon vessel is heated at approximately 2000° C. by high-frequency heating in an inert atmosphere of He gas or the like using the Sn capsule as a combustion assistant. In the oxygen measurement, the carbon vessel and the oxygen in the sample react with each other through the high-temperature heating and by detecting the generated carbon dioxide, the amount of oxygen can be calculated. In the case of coating the magnetic metal with the organic compound whose main chain includes a hydrocarbon, only the amount of oxygen originated from the oxide layer 21 is separated and determined by controlling the temperature and changing the combustion atmosphere. When the amount of oxygen in the first particle aggregate is 0.5 mass % or less, the proportion of the oxide layer 21 in the coating layer 20 is decreased, and the heat resistance and the thermal reliability are deteriorated. If the amount of oxygen in the first particle aggregate is 10 mass % or more, the oxide layer 21 is easily separated.

(Coating Layer/Carbon-Contained Material Layer)

As the carbon-contained material layer 22 constituting a part of the coating layer 20, at least one kind of carbon material selected from a third group of a hydrocarbon gas reaction product, a carbide, and an organic compound can be employed. By the presence of this layer, the oxidation of the metal material of the core portion 12 can be suppressed more effectively and the resistance to oxidation is improved.

The carbon-contained material layer 22 preferably has an average thickness of 0.1 nm or more and 10 nm or less, and more preferably 1 nm or more and 5 nm or less. The thickness herein referred to indicates the length along the straight line connecting the outer edge and the center of the magnetic metal particle 10. When the thickness of the carbon-contained material layer 22 is less than 1 nm, the oxidation resistance is insufficient. Moreover, the resistance of the composite member is remarkably deteriorated to easily generate the eddy current loss, in which case the high-frequency characteristic of the magnetic permeability may be deteriorated.

On the other hand, if the thickness of the carbon-contained material layer 22 is greater than 10 nm, when a desired member is fabricated by unifying the magnetic metal particles 10 coated with the carbon-contained material layer 22, the filling ratio of the magnetic metal included in the member is decreased by the thickness of the oxide layer 21, whereby the saturation magnetization of the composite member to be obtained may deteriorate and the magnetic permeability may be deteriorated accordingly.

The thickness of the carbon-contained material layer 22 can be obtained by the TEM observation.

The hydrocarbon gas reaction product is used as a film, and is a material generated by decomposing the hydrocarbon gas on the surface of the magnetic metal particle 10. The hydrocarbon gas corresponds to, for example, acetylene gas, propane gas, methane gas, or the like. This reaction product is, although not definitely, considered to contain a thin film of carbon. The carbon-contained material layer 22 preferably has appropriate crystallinity.

For evaluating the crystallinity of the carbon-contained material layer 22, specifically, there is a method of evaluating the crystallinity of the carbon-contained material layer 22 by the hydrocarbon vaporizing temperature. An apparatus such as TG-MS (thermogravimetry-mass spectrometer) is used and the analysis is conducted under the atmospheric pressure and the hydrogen gas flow and while the generation of the hydrocarbon (e.g., the mass number is 16) is monitored, the crystallinity is evaluated based on the temperature at which the amount of generation is the maximum. The hydrocarbon vaporizing temperature is preferably in the range of 300° C. to 650° C., and more preferably 450° C. to 550° C. This is because when the hydrocarbon vaporizing temperature is higher than 650° C., the carbon-contained material layer 22 becomes too dense, in which case the generation of the oxide layer 21 is interrupted and when the temperature is lower than 300° C., the carbon-contained material layer 22 contains too many defects, in which case the excessive oxidation progresses.

The carbon-contained material layer 22 may be a carbide. The carbide in this case may be a carbide of the element of the first or second element group included in the magnetic metal particle 10. Above all, silicon carbide and iron carbide are preferable because those carbides are stable and have the appropriate thermal reliability.

The carbon-contained material layer 22 may be the organic compound. The organic compound layer may be formed on the surface of the hydrocarbon gas reaction product. The organic compound is desirably the organic polymers or oligomers whose main chain is formed by any of carbon, hydrogen, oxygen, and nitrogen.

This organic compound is solid under normal temperature and normal pressure. For example, either a natural compound or a synthetic compound can be selected from the organic polymers or the oligomers. The polymers or oligomers of this embodiment can be obtained by known radical polymerization or polycondensation.

The organic compound can be selected from, for example, a single polymer and a copolymer including polyolefins, polyvinyls, polyvinylalcohols, polyesters, polylactic acids, polyglycols, polystyrenes, polymethylmethacrylates, polyamides, polyurethanes, polycelluloses, or an epoxy compound. The organic compound can be selected from polysaccharides of natural polymers such as gelatin, pectin, and carrageenan.

The carbon-contained material layer 22 including the organic compound preferably has a thickness of 2 nm or more.

The oxygen transmission coefficient of the organic compound is preferably $1\times10^{-17}$ [$cm^3$ (STP)·cm/$cm^2$·s·Pa] or more under normal temperature and normal pressure. When the oxygen transmission coefficient is less than this value, the formation of the oxide layer 21 does not progress to cause the deterioration in characteristic in the formation of the oxide-carbon-metal particle aggregate, that is, the formation of the magnetic metal particle 10.

In the measurement of the oxygen transmission coefficient, a known technique can be employed; for example, a gas chromatography method of a differential pressure type based on JIS K7126-1:2006 (plastic-film and sheeting—determination of gas transmission rate, Part 1: differential pressure method) can be used. That is, a film of the organic compound is prepared, and pressure is applied on one side and reduced on the other transmission side; thus, the measurement can be conducted. On this occasion, the transmitted gas is separated through the gas chromatography and the amount of gas transmission per unit time is obtained using a thermal conduction detector (TCD) and a flame ionization detector (FID), whereby the oxygen transmission coefficient can be calculated.

In this embodiment, the oxide layer 21 and the carbon-contained material layer 22 before the metal-contained particle composite member is formed exhibit the operation as below.

When just the carbon-contained material layer 22 is included, the oxidation of the magnetic metal particle 10 suddenly progresses due to, for example, the crack of the carbon-contained material layer 22 and heat is generated partially. Therefore, oxidation is sequentially caused involving the peripheral particles to deteriorate the magnetic characteristic of the magnetic metal particle 10.

When just the oxide layer 21 is included, the inhomogeneous portion is formed in the oxide composition, and the area where the oxide layer 21 mainly including the element of the first group but not including the oxide of the metal of the second group is present may increase. The oxide of the element of the second group suppresses the diffusion of the element and is highly protective for the core portion 12 but the oxide of the element of the first group causes more element diffusion than the oxide of the element of the second group and is less protective for the core portion 12. Therefore, when the oxide of the element of the first group is much contained in the oxide layer 21, the excessive oxidation of the core portion 12 progresses, and the function is weakened when the magnetic material is structured as the metal-contained particle composite member.

By having the oxide layer 21 and the carbon-contained material layer 22 included as appropriate, the oxidation resistance of the magnetic metal particle 10 can be maintained to be favorable. When the separation of the oxide layer 21 is suppressed and the metal-contained particle composite member is structured to have excellent heat resistance, the magnetic material with excellent thermal stability in the magnetic characteristic for a long term can be provided.

The proportion between the oxide layer 21 and the carbon-contained material layer 22 is preferably in the range of 1:20 to 1:1.

The volume filling ratio of the magnetic metal particle aggregate 100 in the radio wave absorber 200 is preferably 10% or more and 60% or less, and more preferably 15% or more and 50% or less. When the ratio is greater than the above range, the properties of the metal are exhibited and thus the reflectance is increased and the radio wave absorbing characteristic is deteriorated. On the other hand, when the ratio is less than the above range, the saturation magnetization may deteriorate and the radio wave absorbing characteristic based on the magnetic characteristic may deteriorate accordingly. In addition, the thickness necessary for achieving the practical radio wave absorbing characteristic may become too large.

The volume filling ratio of the radio wave absorber 200 can be calculated by, for example, performing an image process on a photograph obtained by selecting 500000 times or 1000000 times depending on the particle diameter of the magnetic metal particle using the TEM. It is noted that the volume of the coating layer 20 is not included in the volume of the metal particle and the volume of just the core portion 12 is regarded as the volume of the magnetic metal particle 10.

The electric resistivity of the radio wave absorber 200 is preferably 10 MΩ·cm or more, more preferably 100 MΩ·cm or more, and much more preferably 1000 MΩ·cm or more. Within this range, the reflection of radio wave is suppressed and the high radio wave absorbing characteristic with high loss can be obtained. The electric resistivity is led by providing an Au electrode with a diameter of 5 mm by a sputtering process on each of front and back surfaces of the radio wave absorber 200 with a disc-like shape having a diameter of 15 mm and a thickness of 1 mm and reading the current value when a voltage of 10 V is applied between the Au electrodes. Since the current value has the time dependence, the electric resistivity can be estimated from the value obtained after two minutes from when the voltage is applied.

(Manufacturing Method for Magnetic Metal Particle Aggregate)

An example of the manufacturing method for the magnetic metal particle aggregate 100 of this embodiment is described.

(1) A step of forming a metal-contained particle by inputting into plasma at least one magnetic metal element selected from the first group of Fe, Co, and Ni and at least one metal selected from the second group of Mg, Al, Si, Ca, Zr, Ti, Hf, Zn, Mn, a rare-earth metal element, Ba, and Sr (alloy particle formation step).

(2) A step of coating the surface of the metal-contained particle with the carbon-contained material layer 22 (carbon coating step).

(3) A step of oxidizing the metal-contained alloy particle coated with the carbon under the oxygen-contained atmosphere (oxidizing step).

(4) A step of removing the carbon coating formed in the carbon coating step (2) that is employed as necessary (carbon removing step).

(5) A step of heating the magnetic metal particle 10 to bind between the particles (diffusion binding step). When the metal element selected from the second group is not contained, for example, the alloy particle formation step (1) and the diffusion binding step (5) among the above steps are employed.

Description is made of the steps (1) to (5).

((1): Alloy Particle Formation Step)

A thermal plasma method or the like is preferably used for fabricating the magnetic particle. Description is hereinafter made of the manufacturing method for the magnetic particle in which the thermal plasma method is employed.

First, plasma is generated by supplying gas mainly containing argon (Ar) as the gas for generating plasma into a high-frequency inductive heating plasma apparatus. Next, the powder of the magnetic metal (metal belonging to the first group) and the powder of the metal belonging to the second group are sprayed to the plasma.

The process for manufacturing the magnetic metal particle 10 is not limited to the thermal plasma method but is preferably performed by the thermal plasma method because the material tissue can be controlled at the nano-level and the mass synthesis is possible.

As the powder of the metal sprayed into the argon gas, the powder of the magnetic metal in which the magnetic metal belonging to the first group and the metal of the second group are dissolved to form the solid solution and which has an average particle diameter of 1 μm or more and 10 μm or less can be used. The powder of the solid solution with an average particle diameter of 1 μm or more and 10 μm or less can be synthesized by an atomizing method or the like. By the use of the powder of the solid solution, the magnetic metal particle 10 with uniform composition can be synthesized by the thermal plasma method.

It is noted that the magnetic metal particle 10 including the solid solution of nitrogen is also preferable because the magnetic anisotropy is high. For forming the solid solution of nitrogen, a method is given in which argon and nitrogen are introduced as the gas for generating plasma, for example; however, the present disclosure is not limited thereto.

((2): Carbon Coating Step)

Next, the step of coating the magnetic metal particle 10 with the carbon-contained material layer 22 is described. In this step, (a) a method of causing reaction of the hydrocarbon gas on the surface of the magnetic metal particle 10, (b) a method of producing a carbide through the reaction between carbon and the metal element included in the magnetic metal particle 10 on the surface of the magnetic metal particle 10, (c) a method of coating the surface of the magnetic metal particle 10 with the organic compound having a main chain including hydrocarbon, or the like can be employed.

In the method of causing the reaction of the hydrocarbon gas, which corresponds to the method (a) above, carrier gas is introduced to the surface of the magnetic metal particle 10 together with the hydrocarbon gas to cause the reaction; the product obtained by the reaction is used to coat the surface of the magnetic metal particle 10. The hydrocarbon gas to be used is not particularly limited; for example, acetylene gas, propane gas, methane gas, or the like is given.

The alloy mainly containing Fe, Co, or Ni is known as the catalyst for decomposing the hydrocarbon gas to separate out carbon. Through this reaction, the favorable carbon-contained material layer 22 can be formed. In other words, the carbon layer that prevents the contact between the magnetic metal particles 10 is obtained by bringing the alloy particle mainly containing Fe, Co, or Ni and the hydrocarbon gas into contact with each other in the appropriate temperature range that enables the catalyst operation.

The reaction temperature for the alloy particle mainly containing Fe, Co, or Ni and the hydrocarbon gas is preferably 200° C. or more and 1000° C. or less though the temperature may be different depending on the species of the hydrocarbon gas. When the temperature is lower than the above, the carbon does not separate out sufficiently, which is not enough for the coating. On the other hand, when the temperature is higher than the above, the potential of carbon becomes too high, and thus the separation excessively progresses.

The reaction temperature for the hydrocarbon gas and the metal forming the carbon-contained material layer 22 affects the stability of the carbon-contained material layer 22, that is, the crystallinity thereof. The carbon-contained material layer 22 formed at high reaction temperature is vaporized into the hydrocarbon gas at high temperature and the carbon-contained material layer 22 formed at low reaction temperature is vaporized into the hydrocarbon gas at low temperature.

In this manner, the stability of the carbon-contained material layer 22 can be evaluated by the heating experiments in hydrogen. With the use of the apparatus employing the TG-MS method or the like, the hydrocarbon vaporizing temperature can be evaluated by measuring the temperature at which the vaporizing concentration becomes the maximum. For example, the temperature at which the generation of the hydrocarbon gas with a mass number of 16 is the maximum is used as the thermal decomposition peak temperature, and if this peak temperature is higher, the carbon-contained material layer 22 can have higher stability and if this peak temperature is lower, the carbon-contained material layer 22 can have lower stability.

Moreover, a method of simultaneously spraying a raw material including carbon and a raw material of the carbon-contained material layer 22 is given. The raw material including carbon to be used in this method may be pure carbon, for example; however, the present disclosure is not limited thereto.

The second method (b) is preferable in that the magnetic metal particle 10 can be coated with uniform carbon; however, the step of coating the surface of the magnetic metal particle 10 with carbon is not necessarily limited to the above two methods.

As a method of carbonizing the metal element on the surface of the magnetic metal particle 10, a known method can be employed. For example, a method of forming the carbide through the reaction with acetylene gas or methane gas by CVD is given. With this method, the thermally stable carbon-contained material layer 22 such as silicon carbide or iron carbide can be formed.

Next, as the method (c) of coating the organic compound, various known methods can be employed. For example, a physical chemical nano-encapsulating method and a chemical nano-encapsulating method are known. The physical chemical method can be selected from phase separation, coacervation, and other known physical chemical methods for enabling the nano-encapsulation. The chemical method can be selected from interface polycondensation, interface polymerization, polymerization in dispersion medium, in-situ polycondensation, emulsion polymerization, and other known chemical methods for enabling the nano-encapsulation. The coating layer of the organic compound is bound with the magnetic metal particle 10 or the oxide layer 21 through the physical binding without the covalent bond.

By the above method, the magnetic metal particle 10 and a composite particle coated with polymer having a thickness larger than 2 nm can be obtained.

Alternatively, the magnetic metal particle 10 can be input into a polymer solution and the solution can be homogenized to form a shell including the organic compound. This method is more preferable from the industrial point of view because the method is simple.

In this method, it is not always necessary that the particles exist alone and may exist as an aggregate having an organic compound layer with desired thickness formed therein between the magnetic metal particles 10.

((3): Oxidizing Step)

Description is made of the step of oxidizing the magnetic metal particle 10 coated with carbon obtained in the above step in the presence of oxygen. The oxide layer 21 is formed at the interface between the magnetic metal particle 10 and the carbon-contained material layer 22 or the oxide layer 21 is formed by partially oxidizing and decomposing the carbon-contained material layer 22.

This process oxidizes the magnetic metal particle 10; in particular, the metal belonging to the second group included in the magnetic metal particle 10 is preferably oxidized. In other words, at least one metal selected from Mg, Al, Si, Ca, Zr, Ti, Hf, Zn, Mn, a rare-earth metal element, Ba, and Sr is oxidized to form the oxide layer 21 on the surface of the magnetic metal particle 10.

The oxidizing atmosphere is not particularly limited and may be air atmosphere, oxygen, $CO_2$, or gas including steam. In the case of using oxygen, when the oxygen concentration is high, the oxidation may progress instantly to cause the particles to aggregate due to the excessive heat generation or the like. Therefore, it is desirable to use the gas including 5% or less, and more desirably 0.001% to 3%, of oxygen in the inert gas such as Ar or $N_2$, but the present disclosure is not limited thereto.

The oxidation in the above atmosphere may be conducted under the heating environment. The temperature in this case is not particularly limited but the temperature is preferably in the range of room temperature to approximately 300° C. This is because the oxidation progresses less easily below this temperature range and the oxidation drastically occurs and the particles aggregate over this temperature range.

The atmosphere gas and the temperature used in the oxidizing step are preferably selected based on the crystallinity of the carbon-contained material layer 22, that is, the balance between the stability and the film thickness. In other words, in the case of using the carbon-contained material layer 22 with high stability, the oxidation is preferably conducted in the state that the oxygen potential is high and in the case of using the carbon-contained material layer 22 with low stability, the oxidation is preferably conducted in the state that the oxygen potential is low.

In the case of using the carbon-contained material layer 22 with large thickness, the oxidation is preferably conducted in the state that the oxygen potential is high, and in the case of using the carbon-contained material layer 22 with small thickness, the oxidation is preferably conducted in the state that the oxygen potential is low. In the case where the oxidation is conducted in a short period of time, the oxygen gas concentration may be approximately 10%. By the manufacturing method as above, the magnetic metal particle 10 whose coating layer 20 includes the carbon-contained material layer 22 and the oxide layer 21 can be manufactured.

((4): Carbon Removing Step)

When the magnetic metal particle 10 obtained by the steps up to the above step is heated in, for example, a hydrogen atmosphere at temperatures of several hundreds of degrees, the carbon-contained material layer 22 of the magnetic metal particle 10 is removed. Therefore, the magnetic metal particle 10 including the magnetic metal particle 10 at least a part of which has the surface coated with the oxide layer 21 is obtained. By this step, the filling ratio of the particles when the metal-contained particle composite member is obtained can be increased. In the case of removing the organic compound such as the aforementioned organic polymers and oligomers, the thermal decomposition may be conducted in the presence of oxygen or hydrogen to perform the decomposition and removal.

Although the atmosphere of the heat treatment is not particularly limited, the reducing atmosphere for making the carbon into the hydrocarbon gas and the oxidizing atmosphere for making the carbon into carbon oxide gas are given.

The oxide layer 21 including the element of the second group is generally stable at temperatures up to around 1000° C. in either the reducing or oxidizing atmosphere gas, and decomposing and vaporizing the oxide layer 21 are difficult. On the other hand, the carbon or the carbide layer becomes the hydrocarbon gas through the heat treatment at temperatures of several hundreds of degrees in hydrogen. Similarly, the carbon or the carbide layer becomes the carbon oxide gas through the heat treatment at temperatures of several hundreds of degrees in the oxidizing atmosphere. Therefore, by selecting the heating atmosphere, just the carbon-contained material layer 22 can be removed as selected with the oxide layer 21 left.

The reducing atmosphere may be, for example, the atmosphere of argon or nitrogen including the reducing gas such as methane or hydrogen. The hydrogen gas atmosphere with a concentration of 50% or more is more preferable because the carbon-contained material layer 22 can be removed more efficiently.

The oxidizing atmosphere may be, for example, gas including an oxygen atom, such as oxygen, carbon dioxide, or steam, or a mix gas including the gas including the oxygen atom and nitrogen or argon.

The atmosphere of nitrogen or argon including the reducing gas is preferably air flow with a speed of 10 mL/min or more.

The heating temperature in the reducing atmosphere is not particularly limited and is preferably in the range of 100° C. to 800° C. In particular, the temperature range of 300° C. or more and 800° C. or less is preferable. When the heating temperature is lower than 100° C., the reducing reaction may become slower. On the other hand, when the heating temperature is higher than 800° C., the aggregation or particle growth of the separated metal microparticles may proceed in a short time.

More preferably, the selection is made based on the crystallinity of the carbon-contained material layer 22, that is, the stability of the carbon-contained material layer 22. In other words, in the case of the carbon-contained material layer 22 with high stability, the temperature is preferably set to be relatively high; in the case of the carbon-contained material layer 22 with low stability, the temperature is preferably set to be relatively low.

The heat treatment temperature and time are not particularly limited as long as at least the carbon-contained material layer 22 can be reduced.

The amount of carbon contained in the first particle aggregate after the process of removing carbon with the reducing gas is preferably 1 mass % or less because the electric influence is reduced.

In the process of removing the carbon in the oxidizing atmosphere, air, the mix gas such as oxygen-argon or oxygen-nitrogen, humidified argon whose dew point is controlled, or humidified nitrogen is used, for example.

In the method of removing the carbon in the oxidizing atmosphere, the oxygen partial pressure is preferably as low as possible. Alternatively, a method of removing the carbon-contained material layer 22 using hydrogen and the mix gas including the oxygen atom can be employed. In this case, since the carbon removal and oxidation can be advanced at the same time, the oxide layer 21 that is more stable can be formed.

The mix gas is not particularly limited and may be the mix gas of hydrogen and argon-oxygen, hydrogen gas whose dew point is controlled, or the like.

The magnetic metal particles 10 obtained thus have the surface coated with the oxide film and thus do not easily aggregate.

Before this carbon removing step, the magnetic metal particle 10 is irradiated with the plasma or energy beam under the oxygen-contained atmosphere or inert atmosphere to damage the crystallinity of the carbon-contained material layer 22; thus, the oxygen transmission properties of the carbon-contained material layer 22 can be controlled and the oxide layer 21 with the appropriate thickness can be formed under the carbon-contained material layer 22. The preferred energy beam is an electron beam, an ion beam, or the like. The oxygen partial pressure of the applicable oxygen-contained atmosphere is preferably 10 Pa or more and $10^3$ Pa or less. Over this range, the excitation or generation of the plasma, the electron beam, or the ion beam becomes difficult; below this range, the effect from the irradiation with the plasma or the energy beam cannot be expected.

((5): Diffusion Binding Step)

When the magnetic metal particles 10 obtained in the steps up to the above step are heated in, for example, the hydrogen atmosphere at temperatures of several hundreds of degrees, the magnetic metal particles 10 diffuse and are bound with each other through the mutual diffusion, whereby the magnetic metal particle aggregate 100 is obtained. Through this step, the average diameter of the magnetic metal particle aggregate 100 can be set to 15 nm or more and 90 nm or less.

Due to the diffusion and binding of the magnetic metal particles 10, the peak appears in 1 to 4 GHz, which is due to the shape of the magnetic metal particle aggregate 100, in addition to achieving the frequency characteristic of the relative magnetic permeability of the magnetic metal particle 10, that is, the peak appearing in 4 to 18 GHz in the relative magnetic permeability imaginary part. When the material has high magnetic loss, the amount of conversion from the electromagnetic wave into the thermal energy inside the material is increased, which can be said that the absorbing characteristic as the absorber is increased. This diffusion binding is preferably conducted in the reducing atmosphere such as 100% hydrogen gas or hydrogen-nitrogen mix gas (e.g., water density is approximately 3%).

(Binding Layer 30 (Binder))

The magnetic metal particle aggregate 100 manufactured by the above embodiment is molded after being mixed with the binder (binding layer 30) such as the resin or the inorganic material illustrated in FIG. 2 and used as the radio wave absorber 200 with a desired shape, for example, a sheet-like shape. The binding layer 30 has higher resistance than the magnetic metal particle aggregate 100, and is formed of, for example, resin.

The shape of the radio wave absorber 200 can be film-like, sheet-like or a bulk (pellet-like, ring-like, or rectangular).

In the magnetic metal particle aggregate 100 and the radio wave absorber 200 of this embodiment, the material tissue can be identified or analyzed by the ICP emission spectroscopy and the diffraction pattern (including the confirmation of the solid solution) can be identified or analyzed using TEM diffraction or XRD. Moreover, the structure elements are identified and the quantities thereof can be determined by ICP emission analysis, X-ray fluorescence analysis, EPMA (Electron Probe Micro-Analysis), EDX, SIMS, TG-MS, oxygen-carbon analysis by the infrared absorption, or the like.

The resin that can be used as the binder (binding layer) includes, but not limited to, the following: the polyester-based resin, the polyethylene-based resin, the polystyrene-based resin, the polyvinyl chloride-based resin, the polyvinyl butyral resin, the polyurethane resin, the cellulose-based resin, the ABS resin, the nitrile-butadiene-based rubber, the styrene-butadiene-based rubber, the epoxy resin, the phenol resin, the amide-based resin, the imide-based resin, or the copolymer including any of these.

As an alternative to the resin, an inorganic material such as the oxide, the nitride, or the carbide may be used as the binder. Specifically, the inorganic material may be the oxide including at least one metal selected from the group of Mg, Al, Si, Ca, Zr, Ti, Hf, Zn, Mn, a rare-earth metal element, Ba, and Sr, AlN, $Si_3N_4$, SiC, or the like.

The manufacturing method for the magnetic sheet is not particularly limited; for example, the magnetic metal particles 10, the resin, and the solvent are mixed to form slurry, and the slurry is applied and dried to manufacture the magnetic sheet. Alternatively, a mixture of the magnetic metal particles 10 and the resin may be pressed into a sheet or a pellet. Further alternatively, the magnetic metal particles 10 may be diffused in the solvent and deposited by a method of electrophoresis or the like.

The magnetic sheet may have a multilayer structure. By having the multilayer structure, the thickness can be easily increased and by alternately stacking the magnetic sheet and the non-magnetic insulating layer, the high-frequency magnetic characteristic can be improved. In other words, the magnetic layer including the magnetic metal particle aggregate 100 is formed into the sheet with a thickness of 100 μm or less and this sheet-like magnetic layer and the non-magnetic insulating oxide layer 21 with a thickness of 100 μm or less are stacked alternately. The multilayer structure as above improves the high-frequency magnetic characteristic. Setting the thickness of the single magnetic layer to 100 μm or less can reduce the influence of the diamagnetic field when the high-frequency magnetic field is applied in the in-plane direction, and the magnetic permeability can be increased and moreover the high-frequency characteristic of the magnetic permeability is improved. A method of stacking the layers is not particularly limited and the layers can be stacked by crimping, heating, or burning the stacked magnetic sheets.

EXAMPLES

Detailed description is made below while comparing the examples and comparative examples.

Example 1

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed into the plasma at 3 L/min in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 10 nm coated with the carbon-contained material layer 22 and the oxide layer 21 is obtained.

The carbon-coated magnetic metal particle is heated for an hour in hydrogen atmosphere at 600° C. to remove the carbon and at the same time the diffusion and binding of the magnetic metal particles 10 is performed, whereby the magnetic metal particle aggregate 100 with an average particle diameter of 20 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 2

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 10 nm coated with the carbon-contained material layer 22 and the oxide layer 21 is obtained.

The carbon-coated magnetic metal particle is heated for an hour in hydrogen atmosphere at 700° C. to remove the carbon and at the same time the diffusion and binding of the magnetic metal particles 10 is performed, whereby the magnetic metal particle aggregate 100 with an average particle diameter of 30 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 3

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 10 nm coated with the carbon-contained material layer 22 and the oxide layer 21 is obtained.

The carbon-coated magnetic metal particle is heated for an hour in hydrogen atmosphere at 750° C. to remove the carbon and at the same time the diffusion and binding of the magnetic metal particles 10 is performed, whereby the magnetic metal particle aggregate 100 with an average particle diameter of 50 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 4

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 10 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 105 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 5

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 650° C. to remove the carbon and at the same time the diffusion and binding of the magnetic metal particles 10 is performed, whereby the magnetic metal particle aggregate 100 with an average particle diameter of 50 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 6

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 700° C. to remove the carbon and at the same time the diffusion and binding of the magnetic metal particles 10 is performed, whereby the magnetic metal particle aggregate 100 with an average particle diameter of 80 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 7

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 750° C. to remove the carbon and at the same time the diffusion and binding of the magnetic metal particles 10 is performed, whereby the magnetic metal particle aggregate 100 with an average particle diameter of 115 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 8

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 9

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 50 nm coated with the carbon-contained material layer 22 and the oxide layer 21 is obtained.

The carbon-coated magnetic metal particle is heated for an hour in hydrogen atmosphere at 700° C. to remove the carbon and at the same time the diffusion and binding of the magnetic metal particles 10 is performed, whereby the magnetic metal particle aggregate 100 with an average particle diameter of 80 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Example 10

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 50 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 140 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 1

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 5 nm coated with the carbon-contained material layer 22 and the oxide layer 21 is obtained.

The carbon-coated magnetic metal particle is heated for an hour in hydrogen atmosphere at 600° C. to remove the carbon and at the same time the diffusion and binding of the magnetic metal particles 10 is performed, whereby the magnetic metal particle aggregate 100 with an average particle diameter of 20 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 2

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 5 nm coated with the carbon-contained material layer 22 and the oxide layer 21 is obtained.

The carbon-coated magnetic metal particle is heated for an hour in hydrogen atmosphere at 700° C. to remove the carbon and at the same time the diffusion and binding of the magnetic metal particles 10 is performed, whereby the magnetic metal particle aggregate 100 with an average particle diameter of 25 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 3

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 5 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 100 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 4

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 5 nm coated with the carbon-contained material layer 22 and the oxide layer 21 is obtained.

The carbon-coated magnetic metal particle is heated for an hour in hydrogen atmosphere at 850° C. to remove the carbon and at the same time the diffusion and binding of the magnetic metal particles 10 is performed, whereby the magnetic metal particle aggregate 100 with an average particle diameter of 150 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 5

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 5 nm coated with the carbon-contained material layer 22 and the oxide layer 21 is obtained.

The carbon-coated magnetic metal particle is heated for an hour in hydrogen atmosphere at 900° C. to remove the carbon and at the same time the diffusion and binding of the magnetic metal particles 10 is performed, whereby the magnetic metal particle aggregate 100 with an average particle diameter of 225 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 6

Argon is introduced into a chamber of a high-frequency inductive heating plasma apparatus as the gas for generating plasma at 40 L/min, thereby generating plasma. The Fe powder with an average particle diameter of 10 the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 10 nm coated with the carbon-contained material layer 22 and the oxide layer 21 is obtained.

The carbon-coated magnetic metal particle is heated for an hour in hydrogen atmosphere at 900° C. to remove the carbon and at the same time the diffusion and binding of the magnetic metal particles 10 is performed, whereby the magnetic metal particle aggregate 100 with an average particle diameter of 235 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 7

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 900° C. to remove the carbon and at the same time the diffusion and binding of the magnetic metal particles 10 is performed, whereby the magnetic metal particle aggregate 100 with an average particle diameter of 250 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 8

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 50 nm coated with the carbon-contained material layer 22 and the oxide layer 21 is obtained.

The carbon-coated magnetic metal particle is heated for an hour in hydrogen atmosphere at 900° C. to remove the carbon and at the same time the diffusion and binding of the magnetic metal particles 10 is performed, whereby the magnetic metal particle aggregate 100 with an average particle diameter of 250 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 9

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 100 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 150 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

Comparative Example 10

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 100 nm coated with the carbon-contained material layer 22 and the oxide layer 21 is obtained.

The carbon-coated magnetic metal particle is heated for an hour in hydrogen atmosphere at 900° C. to remove the carbon and at the same time the diffusion and binding of the magnetic metal particles 10 is performed, whereby the magnetic metal particle aggregate 100 with an average particle diameter of 250 nm is obtained.

The magnetic metal particle aggregate 100 and the resin are mixed at a mass ratio of 100:30, and then the thickness thereof is increased to form the evaluation material. The volume filling ratio of the magnetic metal particle aggregate 100 was approximately 30%.

The radio wave absorber 200 including the magnetic metal particle 10 obtained in the examples and the comparative examples is loaded in the coaxial tube test fixture (CSH2-APC7, Kanto Electronic Application and Development Inc.) and the magnetic loss coefficient tan δm(μ"/μ') is calculated from the transmission coefficient $S_{21}$ and the reflection coefficient $S_{11}$ of the S parameter. The sample has the ring-like shape with an inner diameter of 3.04 mm, an outer diameter of 7.00 mm and a thickness of within 2 mm. The determination was: ◎ indicate the excellent one, a ○ indicates the good one, and a letter of x indicates the poor one.

TABLE 1

| | Structure of radio wave absorber | | | | Characteristic of radio wave absorber | | | | | | |
|---|---|---|---|---|---|---|---|---|---|---|---|
| | Average particle diameter of magnetic metal particle (nm) | Heating temperature (° C.) | Average particle diameter of magnetic metal particle aggregate (nm) | Volume filling ratio of magnetic metal particle aggregate (%) | Insulation resistance (MΩ · cm) | Magnetic loss coefficient 2 GHz | Magnetic loss coefficient 12 GHz | Magnetic loss coefficient 18 GHz | Two or more peaks in imaginary part of relative magnetic permeability | Two or more peaks in real part of relative magnetic permeability | Total evaluation |
| Comparative Example 1 | 5 nm | 600° C. | 20 | approximately 30 | >100 (◎) | 0.1 (x) | 0.1 (x) | 0.1 (x) | x | x | x |
| Comparative Example 2 | 5 nm | 700° C. | 25 | approximately 30 | >100 (◎) | 0.1 (x) | 0.1 (x) | 0.1 (x) | x | x | x |
| Comparative Example 3 | 5 nm | 800° C. | 100 | approximately 30 | >100 (◎) | 0.1 (x) | 0.1 (x) | 0.1 (x) | x | x | x |
| Comparative Example 4 | 5 nm | 850° C. | 150 | approximately 30 | >100 (◎) | 0.1 (x) | 0.1 (x) | 0.1 (x) | x | x | x |
| Comparative Example 5 | 5 nm | 900° C. | 225 | approximately 30 | >100 (◎) | 0.1 (x) | 0.1 (x) | 0.1 (x) | x | x | x |
| Example 1 | 10 nm | 600° C. | 20 | approximately 30 | >100 (◎) | >0.5 (○) | >0.5 (○) | >0.5 (○) | ◎ | ◎ | ◎ |
| Example 2 | 10 nm | 700° C. | 30 | approximately 30 | >100 (◎) | >0.5 (○) | >0.5 (○) | >0.5 (○) | ◎ | ◎ | ◎ |
| Example 3 | 10 nm | 750° C. | 50 | approximately 30 | >100 (◎) | >0.5 (○) | >0.5 (○) | >0.5 (○) | ◎ | ◎ | ◎ |
| Example 4 | 10 nm | 800° C. | 105 | approximately 30 | >100 (◎) | >0.5 (○) | >0.5 (○) | >0.5 (○) | ◎ | ◎ | ◎ |
| Comparative Example 6 | 10 nm | 900° C. | 235 | approximately 30 | >100 (◎) | 0.1 (x) | 0.1 (x) | 0.1 (x) | x | x | x |

TABLE 1-continued

| | Structure of radio wave absorber | | | | Characteristic of radio wave absorber | | | | | | |
|---|---|---|---|---|---|---|---|---|---|---|---|
| | Average particle diameter of magnetic metal particle (nm) | Heating temperature (° C.) | Average particle diameter of magnetic metal particle aggregate (nm) | Volume filling ratio of magnetic metal particle aggregate (%) | Insulation resistance (MΩ · cm) | Magnetic loss coefficient 2 GHz | Magnetic loss coefficient 12 GHz | Magnetic loss coefficient 18 GHz | Two or more peaks in imaginary part of relative magnetic permeability | Two or more peaks in real part of relative magnetic permeability | Total evaluation |
| Example 5 | 30 nm | 650° C. | 50 | approximately 30 | >100 (◎) | >0.5 (○) | >0.5 (○) | >0.5 (○) | ◎ | ◎ | ◎ |
| Example 6 | 30 nm | 700° C. | 80 | approximately 30 | >100 (◎) | >0.5 (○) | >0.5 (○) | >0.5 (○) | ◎ | ◎ | ◎ |
| Example 7 | 30 nm | 750° C. | 115 | approximately 30 | >100 (◎) | >0.5 (○) | >0.5 (○) | >0.5 (○) | ◎ | ◎ | ◎ |
| Example 8 | 30 nm | 800° C. | 130 | approximately 30 | >100 (◎) | >0.5 (○) | >0.5 (○) | >0.5 (○) | ◎ | ◎ | ◎ |
| Comparative Example 7 | 30 nm | 900° C. | 250 | approximately 30 | >100 (◎) | 0.1 (x) | 0.1 (x) | 0.1 (x) | x | x | x |
| Example 9 | 50 nm | 700° C. | 80 | approximately 30 | >100 (◎) | >0.5 (○) | >0.5 (○) | >0.5 (○) | ◎ | ◎ | ◎ |
| Example 10 | 50 nm | 800° C. | 140 | approximately 30 | >100 (◎) | >0.5 (○) | >0.5 (○) | >0.5 (○) | ◎ | ◎ | ◎ |
| Comparative Example 8 | 50 nm | 900° C. | 250 | approximately 30 | >100 (◎) | 0.1 (○) | 0.1 (○) | 0.1 (○) | x | x | x |
| Comparative Example 9 | 100 nm | 800° C. | 150 | approximately 30 | >100 (◎) | 0.1 (x) | 0.1 (x) | 0.1 (x) | x | x | x |
| Comparative Example 10 | 100 nm | 900° C. | 250 | approximately 30 | >100 (◎) | 0.1 (x) | 0.1 (x) | 0.1 (x) | x | x | x |

As indicated by Table 1, the radio wave absorber 200 has the excellent characteristic when the magnetic metal particle 10 has an average particle diameter of 10 nm or more and 50 nm or less, the magnetic metal particle aggregate 100 has a particle diameter of 15 nm or more and 200 nm or less, and the heating temperature is 600° C. or more and 800° C. or less.

Example 11

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was approximately 15.2%.

Example 12

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was 25%.

Example 13

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was 36.7%.

Example 14

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was 49.2%.

Comparative Example 11

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was 8.1%.

Comparative Example 12

Argon is introduced into a chamber of a high-frequency inductive heating plasma apparatus as the gas for generating plasma at 40 L/min, thereby generating plasma. The Fe powder with an average particle diameter of 10 μm, the Co powder with an average particle diameter of 10 μm, and the Al powder with an average particle diameter of 3 μm, which are the raw materials, are sprayed at 3 L/min into the plasma in this chamber together with argon (carrier gas) so that the mass ratio of the powder is Fe:Co:Al=69:31:5 relative to the total amount.

At the same time, methane gas as the raw material of the carbon coating is introduced into the chamber together with the Ar carrier gas, and the gas temperature and the powder temperature are controlled; thus, the magnetic metal particle 10 in which the FeCoAl alloy particle is coated with carbon is obtained.

This carbon-coated magnetic metal particle is oxidized for approximately 5 minutes, whereby the magnetic metal particle 10 with an average particle diameter of 30 nm coated with the carbon-contained material layer 22 and the oxide layer 21 is obtained.

The carbon-coated magnetic metal particle is heated for an hour in hydrogen atmosphere at 800° C. to remove the carbon and at the same time the diffusion and binding of the magnetic metal particles 10 is performed, whereby the magnetic metal particle aggregate 100 with an average particle diameter of 130 nm is obtained.

The magnetic metal particle aggregate 100 and the resin are mixed, and then the thickness thereof is increased to form the evaluation material. The volume filling ratio of the magnetic metal particle aggregate 100 was 65%.

The radio wave absorber 200 including the magnetic metal particle 10 obtained in the examples and the comparative examples is loaded in the coaxial tube test fixture (CSH2-APC7, Kanto Electronic Application and Development Inc.) and the magnetic loss coefficient tan $\delta m(\mu''/\mu')$ is calculated from the transmission coefficient $S_{21}$ and the reflection coefficient $S_{11}$ of the S parameter. The sample has the ring-like shape with an inner diameter of 3.04 mm, an outer diameter of 7.00 mm and a thickness of within 2 mm. The determination was: ⊙ indicate the excellent one, a ○ indicates the good one, and a letter of x indicates the poor one.

TABLE 2

| | Structure of radio wave absorber | | | | | Characteristic of radio wave absorber | | | | | | |
|---|---|---|---|---|---|---|---|---|---|---|---|---|
| | Average particle diameter of magnetic metal particle (nm) | Heating temperature (° C.) | Average particle diameter of magnetic metal particle aggregate (nm) | Volume filling ratio of magnetic metal particle aggregate (%) | Volume filing ratio of magnetic composition | Insulation resistance (MΩ · cm) | Magnetic loss coefficient 2 GHz | Magnetic loss coefficient 12 GHz | Magnetic loss coefficient 18 GHz | Two or more peaks in imaginary part of relative magnetic permeability | Two or more peaks in real part of relative magnetic permeability | Total evaluation |
| Comparative Example 11 | 30 nm | 800° C. | 130 | 8.1 | 5 | >100 (⊚) | 0.1 (x) | 0.1 (x) | 0.1 (x) | ⊚ | ⊚ | x |
| Example 11 | 30 nm | 800° C. | 130 | 15.2 | 10.5 | >100 (⊚) | >0.5 (○) | >0.5 (○) | >0.5 (○) | ⊚ | ⊚ | ⊚ |
| Example 12 | 30 nm | 800° C. | 130 | 25 | 18 | >100 (⊚) | >0.5 (○) | >0.5 (○) | >0.5 (○) | ⊚ | ⊚ | ⊚ |
| Example 13 | 30 nm | 800° C. | 130 | 36.7 | 24 | >100 (⊚) | >0.5 (○) | >0.5 (○) | >0.5 (○) | ⊚ | ⊚ | ⊚ |
| Example 14 | 30 nm | 800° C. | 130 | 49.2 | 32 | >100 (⊚) | >0.5 (○) | >0.5 (○) | >0.5 (○) | ⊚ | ⊚ | ⊚ |
| Comparative Example 12 | 30 nm | 800° C. | 130 | 65 | 40 | 0.001 (no good) | >0.5 (○) | >0.5 (○) | >0.5 (○) | ⊚ | ⊚ | x |

As indicated by Table 2, the radio wave absorber 200 has the excellent characteristic when the volume filling ratio of the magnetic metal particle aggregate 100 is 10% or more and 60% or less.

The above examples and comparative examples employ the magnetic metal particle 10 having the coating layer 20; however, the same results are obtained with the magnetic metal particle 10 not having the coating layer 20.

While certain embodiments have been described, these embodiments have been presented by way of example only, and are not intended to limit the scope of the inventions. Indeed, a magnetic metal particle aggregate and a radio wave absorber described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A magnetic metal particle aggregate comprising:

a plurality of magnetic metal particles including at least one magnetic metal selected from a first group consisting of Fe, Co, and Ni, one of the plurality of magnetic metal particles being partly physically bound to at least another one of the plurality of magnetic metal particles, a first average particle diameter of the plurality of magnetic metal particles being 10 nm or more and 50 nm or less, wherein the magnetic metal particle aggregate has a second average particle diameter of 15 nm or more and 200 nm or less.

2. The magnetic metal particle aggregate according to claim 1, wherein a frequency dependence of an imaginary part of relative magnetic permeability of the magnetic metal particle aggregate has peaks at two frequencies.

3. The magnetic metal particle aggregate according to claim 1, wherein a frequency dependence of a real part of relative magnetic permeability of the magnetic metal particle aggregate has peaks at two frequencies.

4. The magnetic metal particle aggregate according to claim 1, comprising a necking section formed between two physically bound magnetic metal particles.

5. The magnetic metal particle aggregate according to claim 4, wherein the necking section has a length shorter than a diameter of either of the two physically bound magnetic metal particles.

6. A radio wave absorber comprising:

a magnetic metal particle aggregate, including a plurality of magnetic metal particles including at least one magnetic metal selected from a first group consisting of Fe, Co, and Ni, one of the plurality of magnetic metal particles being partly bound to at least another one of the plurality of magnetic metal particles, a first average particle diameter of the plurality of magnetic metal particles being 10 nm or more and 50 nm or less, wherein the magnetic metal particle aggregate has a second average particle diameter of 15 nm or more and 200 nm or less; and a binding layer having higher resistance than the magnetic metal particle aggregate.

7. The radio wave absorber according to claim 6, wherein a volume filling ratio of the magnetic metal particle aggregate in the radio wave absorber is 10% or more and 60% or less.

8. The radio wave absorber according to claim 6 having an electric resistivity of 10 MΩ·cm or more.

9. A magnetic metal particle aggregate comprising:

a plurality of magnetic metal particles, each of the plurality of magnetic metal particles including a core portion including at least one magnetic metal selected from a first group consisting of Fe, Co, and Ni, and at least one metal selected from a second group consisting of Mg, Al, Si, Ca, Zr, Ti, Hf, Zn, Mn, a rare-earth metal element, Ba, and Sr, and a coating layer coating the core portion and including at least one metal selected from the second group, the metal being included in the core portion, wherein one of the magnetic metal particles is partly bound to another one of the magnetic metal particles, the magnetic metal particles having a first average particle diameter of 10 nm or more and 50 nm or less; and the magnetic metal particle aggregate has a second average particle diameter of 15 nm or more and 200 nm or less.

10. The magnetic metal particle aggregate according to claim 9, wherein a frequency dependence of an imaginary part of relative magnetic permeability of the magnetic metal particle aggregate has peaks at two frequencies.

11. The magnetic metal particle aggregate according to claim 9, wherein a frequency dependence of a real part of relative magnetic permeability of the magnetic metal particle aggregate has peaks at two frequencies.

12. The magnetic metal particle aggregate according to claim 9, wherein the coating layer further includes a carbon-contained material layer including at least one kind selected from a third group consisting of a hydrocarbon gas reaction product, a carbide, and an organic compound.

13. A radio wave absorber comprising:

a magnetic metal particle aggregate comprising a plurality of magnetic metal particles, each of the plurality of magnetic metal particles including a core portion including at least one magnetic metal selected from a first group consisting of Fe, Co, and Ni, and at least one metal selected from a second group consisting of Mg, Al, Si, Ca, Zr, Ti, Hf, Zn, Mn, a rare-earth metal element, Ba, and Sr and a coating layer coating the core portion and including at least one metal selected from the second group, the metal being included in the core portion, wherein one of the magnetic metal particles is partly bound to another one of the magnetic metal particles, the magnetic metal particles having a first average particle diameter of 10 nm or more and 50 nm or less, and wherein the magnetic metal particle aggregate has a second average particle diameter of 15 nm or more and 200 nm or less; and a binding layer having higher resistance than the magnetic metal particle aggregate.

14. The radio wave absorber according to claim 13, wherein a volume filling ratio of the magnetic metal particle aggregate in the radio wave absorber is 10% or more and 60% or less.

15. The radio wave absorber according to claim 13 having an electric resistivity of 10 MΩ·cm or more.

16. The radio wave absorber according to claim 13, further comprising an oxide particle including at least one metal selected from the second group, the metal being included in the core portion.

* * * * *